United States Patent [19]
Klein et al.

[11] Patent Number: 5,872,850
[45] Date of Patent: Feb. 16, 1999

[54] SYSTEM FOR ENABLING INFORMATION MARKETPLACE

[75] Inventors: Saul Charles Klein; Max E. Metral, both of Boston; Upendra Shardanand, Cambridge, all of Mass.

[73] Assignee: Microsoft Corporation, Redmond, Wash.

[21] Appl. No.: 828,632

[22] Filed: Mar. 31, 1997

Related U.S. Application Data

[63] Continuation-in-part of Ser. No. 597,442, Feb. 2, 1996.

[60] Provisional application No. 60/000,598 and provisional application No. 60/008,458 Dec. 11, 1995.

[51] Int. Cl.[6] .................................................. H04L 9/00
[52] U.S. Cl. ................................................................ 380/49
[58] Field of Search ........................ 380/5, 49; 370/58.1; 705/10, 26

[56] References Cited

U.S. PATENT DOCUMENTS

| | | | |
|---|---|---|---|
| 4,914,694 | 4/1990 | Leonard et al. | 380/5 |
| 5,034,981 | 7/1991 | Leonard et al. | 380/5 |
| 5,544,161 | 8/1996 | Bigham et al. | 370/58.1 |

*Primary Examiner*—Salvatore Cangialosi
*Attorney, Agent, or Firm*—Michaelson & Wallace; Peter L. Michaelson

[57] ABSTRACT

A system for enabling an information marketplace includes a central server which stores data in a memory element. The data may or may not be encrypted. Regardless of whether the data is encrypted the server may also store a table which associates data elements and nodes with an authorization value. If a node requests data for which the authorization value in the table gives the node authorization to access, the server transmits the data to the node. If the data is encrypted, the server may transmit the encrypted data or it may decrypt the data for the node before transmission. In other embodiments, no table is stored by the server. In these embodiments the data is encrypted using one or more encryption keys. When a node requests data the server transmits the encrypted data to the node. If the node does not have the proper encryption keys, it may request them from the server.

27 Claims, 8 Drawing Sheets

SYSTEM FOR ENABLING INFORMATION MARKETPLACE

CROSS-REFERENCE TO RELATED APPLICATIONS

This application is a continuation-in-part application of co-pending application Ser. No. 08/597,442 filed Feb. 2, 1996, now pending which itself claims priority to provisional application Ser. No. 60/000,598, filed Jun. 30, 1995, and provisional application 60/008,458, filed Dec. 11, 1995, both of which are now expired and are incorporated herein by reference.

FIELD OF THE INVENTION

The present invention relates to a system for controlling access to collected data and, in particular, to a system for enabling an information marketplace by allowing any one of a number of different entities to place a value on data.

BACKGROUND OF THE INVENTION

The amount of information, as well as the number of goods and services, available to individuals is increasing exponentially. This increase in items and information is occurring across all domains, e.g. sound recordings, restaurants, movies, World Wide Web pages, clothing stores, etc. An individual attempting to find useful information, or to decide between competing goods and services, is often faced with a bewildering selection of sources and choices.

Individual sampling of all items, even in a particular domain, may be impossible. For example, sampling every restaurant of a particular type in New York City would tax even the most avid diner. Such a sampling would most likely be prohibitively expensive to carry out, and the diner would have to suffer through many unenjoyable restaurants.

In many domains, individuals have simply learned to manage information overload by relying on a form of generic referral system. For example, in the domain of movie and sound recordings, many individuals rely on reviews written by paid reviewers. These reviews, however, are simply the viewpoint of one or two individuals and may not have a likelihood of correlating with how the individual will actually perceive the movie or sound recording. Many individuals may rely on a review only to be disappointed when they actually sample the item.

One method of attempting to provide an efficient filtering mechanism is to use content-based filtering. The content-based filter selects items from a domain for the user to sample based upon correlations between the content of the item and the user's preferences. Content-based filtering schemes suffer from the drawback that the items to be selected must be in some machine-readable form, or attributes describing the content of the item must be entered by hand. This makes content-based filtering problematic for existing items such as sound recordings, photographs, art, video, and any other physical item that is not inherently machine-readable. While item attributes can be assigned by hand in order to allow a content-based search, for many domains of items such assignment is not practical. For example, it could take decades to enter even the most rudimentary attributes for all available network television video clips by hand.

Perhaps more importantly, even the best content-based filtering schemes cannot provide an analysis of the quality of a particular item as it would be perceived by a particular user, since quality is inherently subjective. So, while a content-based filtering scheme may select a number of items based on the content of those items, a content-based filtering scheme generally cannot further refine the list of selected items to recommend items that the individual will enjoy.

Co-pending application Ser. No. 08/597,442, filed Feb. 2, 1996, describes a method for recommending an item to a user which begins by storing a user profile in memory for each user. The user profile includes ratings given to items by the user. An item profile is also stored in memory which includes ratings given to the item by users. The profile of each item rated by the user is retrieved from memory and used to determine which other users of the system have rated that item. The profile of each of those users is retrieved from memory and a similarity factor between the initial user each of the users that have rated the item is calculated. The similarity factors are calculated responsive to the retrieved user profiles. A set of neighboring users is selected responsive to the similarity factors and a weight is assigned to each of the neighboring users. The neighboring users and the weights given to them are used together with the ratings given to items by those neighboring users to recommend at least one item to the initial user.

Users may, however, experience some reluctance in rating items if they are not able to control access to their preference information. This is understandable since the preference information entered by the users will have a high degree of personal content. In addition, users may enter demographic information to further aid the recommendation process and this data may be regarded as especially sensitive data. Since entry of preference data is required in order to make recommendations to the user, and entry of demographic and other data is helpful, a system needs to be provided which allows the user to indicate whether he or she desires to allow his or her data to be transmitted to nodes within a distributed system. The user may also desire to specify certain nodes which may receive the data and other nodes which should not receive data.

SUMMARY OF THE INVENTION

The present invention allows a user to specify what types of data can be transmitted to nodes in a distributed system as well as specify on a per-node basis whether or not the node should be allowed to receive data from the user. The system also allows the user to place a value on the information entered by the user. If a node is willing to pay an amount equal to the value set by the user, then the node may access the users information.

In one aspect, the invention relates to a system for enabling an information marketplace which includes a central server connected to a network. The server also includes a server memory element for storing data and a table is stored in the server memory element which associates data with each of a plurality of nodes. The table indicates whether or not the node has authorization to access the associated information. In some embodiments, the table is stored in a different memory element from the data. In other embodiments, the table indicates whether the associated node has authorization to access the information by setting a bit to a predetermined value. In other embodiments, the associated data is encrypted and the server decrypts the data before transmitting it to a requesting node.

In another aspect, the invention relates to a system for enabling an information marketplace which includes a central server. The central server is connected to a network and includes a memory element for storing data. The data is encrypted with one or more encryption keys which the node must have in order to successfully decrypt the data. In one embodiment one of the encryption keys is the user's password. In another embodiment the server transmits the decryption key to the node. In still other embodiments the server decrypts the data for the node before transmitting the data.

In still another aspect, the invention relates to a method for enabling an information marketplace which begins by encrypting data stored in a server memory element. A request for data is received from a node and the server transmits the requested data to the node. In other embodiments the server also transmits the decryption key to the node. In still other embodiments the server decrypts the data before transmitting it to the node.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
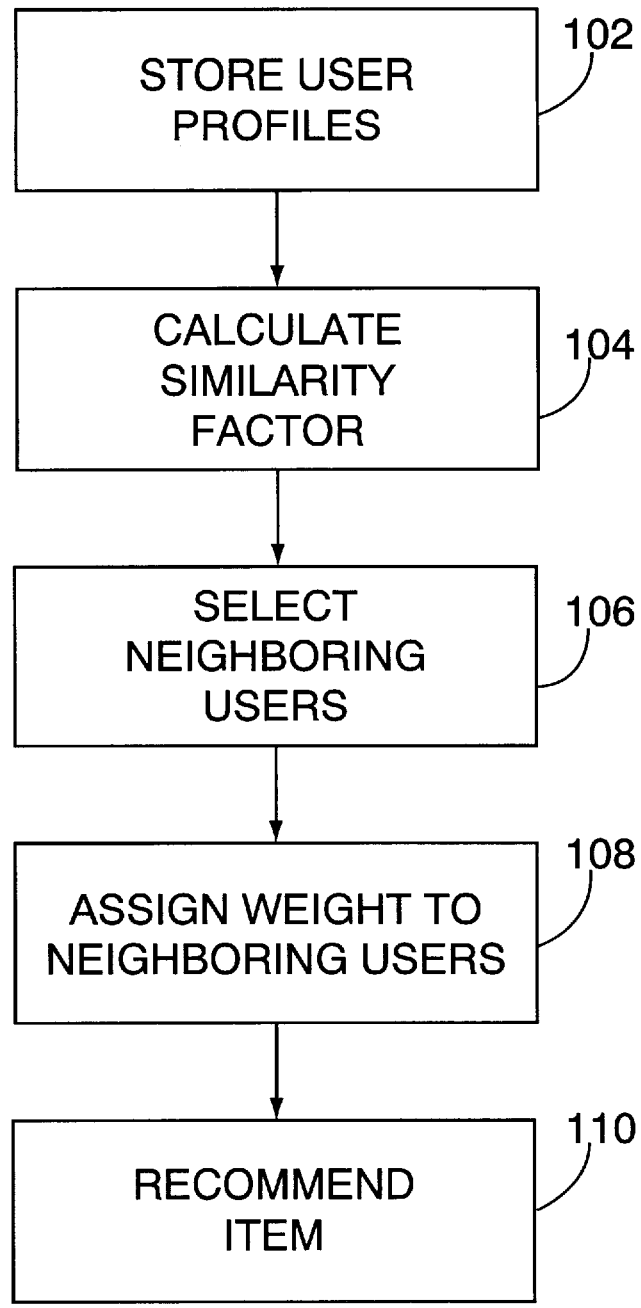
FIG. 1 is a flowchart of one embodiment of the method.

As referred to in this description, items to be recommended can be items of any type that a user may sample in a domain. When reference is made to a "domain," it is intended to refer to any category or subcategory of ratable items, such as sound recordings, movies, restaurants, vacation destinations, novels, or World Wide Web pages. Referring now to FIG. 1, a method for recommending items begins by storing user and item information in profiles.

A plurality of user profiles is stored in a memory element (step 102). One profile may be created for each user or multiple profiles may be created for a user to represent that user over multiple domains. Alternatively, a user may be represented in one domain by multiple profiles where each profile represents the proclivities of a user in a given set of circumstances. For example, a user that avoids seafood restaurants on Fridays, but not on other days of the week, could have one profile representing the user's restaurant preferences from Saturday through Thursday, and a second profile representing the user's restaurant preferences on Fridays. In some embodiments, a user profile represents more than one user. For example, a profile may be created which represents a woman and her husband for the purpose of selecting movies. Using this profile allows a movie recommendation to be given which takes into account the movie tastes of both individuals. For convenience, the remainder of this specification will use the term "user" to refer to single users of the system, as well as "composite users." The memory element can be any memory element known in the art that is capable of storing user profile data and allowing the user profiles to be updated, such as disc drive or random access memory.

Each user profile associates items with the ratings given to those items by the user. Each user profile may also store information in addition to the user's rating. In one embodiment, the user profile stores information about the user, e.g. name, address, or age. In another embodiment, the user profile stores information about the rating, such as the time and date the user entered the rating for the item. User profiles can be any data construct that facilitates these associations, such as an array, although it is preferred to provide user profiles as sparse vectors of n-tuples. Each n-tuple contains at least an identifier representing the rated item and an identifier representing the rating that the user gave to the item, and may include any number of additional pieces of information regarding the item, the rating, or both. Some of the additional pieces of information stored in a user profile may be calculated based on other information in the profile, for example, an average rating for a particular selection of items (e.g., heavy metal albums) may be calculated and stored in the user's profile. In some embodiments, the profiles are provided as ordered n-tuples. Alternatively, a user profile may be provided as an array of pointers; each pointer is associated with an item rated by the user and points to the rating and information associated with the rating.

A profile for a user can be created and stored in a memory element when that user first begins rating items, although in multi-domain applications user profiles may be created for particular domains only when the user begins to explore, and rate items within, those domains. Alternatively, a user profile may be created for a user before the user rates any items in a domain. For example, a default user profile may be created for a domain which the user has not yet begun to explore based on the ratings the user has given to items in a domain that the user has already explored.

Whenever a user profile is created, a number of initial ratings for items may be solicited from the user. This can be done by providing the user with a particular set of items to rate corresponding to a particular group of items. Groups are genres of items and are discussed below in more detail. Other methods of soliciting ratings from the user may include: manual entry of item-rating pairs, in which the user simply submits a list of items and ratings assigned to those items; soliciting ratings by date of entry into the system, i.e., asking the user to rate the newest items added to the system; soliciting ratings for the items having the most ratings; or by allowing a user to rate items similar to an initial item selected by the user. In still other embodiments, the system may acquire a number of ratings by monitoring the user's environment. For example, the system may assume that Web sites for which the user has created "bookmarks" are liked by that user and may use those sites as initial entries in the user's profile. One embodiment uses all of the methods described above and allows the user to select the particular method they wish to employ.

Ratings for items which are received from users can be of any form that allows users to record subjective impressions of items based on their experience of the item. For example, items may be rated on an alphabetic scale ("A" to "F") or a numerical scale (1 to 10). In one embodiment, ratings are integers between 1 (lowest) and 7 (highest). Ratings can be received as input to a stand-alone machine, for example, a user may type rating information on a keyboard or a user may enter such information via a touch screen. Ratings may also be received as input to a system via electronic mail, by telephone, or as input to a system via a local area or wide area network. In one embodiment, ratings are received as input to a World Wide Web page. In this embodiment, the user positions a cursor on a World Wide Web page with an input device such as a mouse or trackball. Once the cursor is properly positioned, the user indicates a rating by using a button on the input device to select a rating to enter. Ratings can be received from users singularly or in batches, and may be received from any number of users simultaneously.

Ratings can be inferred by the system from the user's usage pattern. For example, the system may monitor how long the user views a particular Web page and store in that user's profile an indication that the user likes the page, assuming that the longer the user views the page, the more the user likes the page. Alternatively, a system may monitor the user's actions to determine a rating of a particular item for the user. For example, the system may infer that a user likes an item which the user mails to many people and enter in the user's profile and indication that the user likes that item. More than one aspect of user behavior may be monitored in order to infer ratings for that user, and in some embodiments, the system may have a higher confidence factor for a rating which it inferred by monitoring multiple aspects of user behavior. Confidence factors are discussed in more detail below.

Profiles for each item that has been rated by at least one user may also be stored in memory. Each item profile records how particular users have rated this particular item. Any data construct that associates ratings given to the item with the user assigning the rating can be used. It is preferred is to provide item profiles as a sparse vector of n-tuples. Each n-tuple contains at least an identifier representing a particular user and an identifier representing the rating that user gave to the item, and it may contain other information, as described above in connection with user profiles. As with user profiles, item profiles may also be stored as an array of pointers. Item profiles may be created when the first rating is given to an item or when the item is first entered into the system. Alternatively, item profiles may be generated from the user profiles stored in memory, by determining, for each user, if that user has rated the item and, if so, storing the rating and user information in the item's profile. Item profiles may be stored before user profiles are stored, after user profiles are stored, or at the same time as user profiles. For example, referring to FIG. 2, item profile data and user profile data may be stored as a matrix of values which provides user profile data when read "across," i.e. when rows of the matrix are accessed, and provides item profile data when read "down," i.e. when columns of the matrix are accessed. A data construct of this sort could be provided by storing a set of user n-tuples and a set of item n-tuples. In order to read a row of the matrix a specific user n-tuple is accessed and in order to read a column of the matrix a specific item n-tuple is selected.

The additional information associated with each item-rating pair can be used by the system for a variety of purposes, such as assessing the validity of the rating data. For example, if the system records the time and date the rating was entered, or inferred from the user's environment, it can determine the age of a rating for an item. A rating which is very old may indicate that the rating is less valid than a rating entered recently, for example, users' tastes may change or "drift" over time. One of the fields of the n-tuple may represent whether the rating was entered by the user or inferred by the system. Ratings that are inferred by the system may be assumed to be less valid than ratings that are actually entered by the user. Other items of information may be stored, and any combination or subset of additional information may be used to assess rating validity. In some embodiments, this validity metric may be represented as a confidence factor, that is, the combined effect of the selected pieces of information recorded in the n-tuple may be quantified as a number. In some embodiments, that number may be expressed as a percentage representing the probability that the associated rating is incorrect or as an expected deviation of the predicted rating from the "correct" value.

Since the system may be hosted by any one of a number of different types of machines, or by a machine that is reconfigured frequently, it is desirable to provide data storage for profiles in a hierarchical, isolated manner. The term "isolated," for the purposes of this specification, means that the interface to the physical memory elements storing item and user profiles is abstracted, i.e. the system interacts with the physical memory elements through a defined data object. Although the description of such a data object is couched in terms of profile data and the associated system for recommending items to users, the data object can be used in any system requiring that access to data be provided in an isolated, hierarchical manner, such as databases or distributed file systems.

A data object of the sort described provides an abstraction of a physical memory in which profiles are stored. The data object includes an interface for storing data to the physical memory, an interface for retrieving data from the physical memory, an interface for searching the physical memory, and a link to another data object. In some embodiments the data object is provided with "batch" capability, which will described in detail below.

The interfaces for storing and retrieving profiles from a physical memory implement those functions in a physical memory-specific manner. For example, a data object providing an abstraction of a disk drive memory would accept a "store profile" or "retrieve profile" command from the system and issue the appropriate device driver commands to the disk drive with which it is associated. These commands may include a simple translation of the "store profile" command received into a "write" command issued to the disk drive, or the data object may translate "store profile" command into a series of "write" commands issued to the disk drive. Profile data retrieved from the physical memory is provided to the system via the interface for retrieving data.

The interfaces for storing and retrieving data may be provided as independent functions, dynamically loaded libraries, or subroutines within the object. It is only necessary for the data object to access the underlying physical memory element to retrieve and store the data element, i.e. profile, requested; the data object need not implement functions provided by the memory element unless it is desirable to do so. For example, a data object representing a cache memory need not implement functionality for retrieving cache misses from main memory, although it may be desirable to implement a "cache flush" command in the data object that could be used to reset the underlying physical memory.

The data object includes an interface for searching the physical memory. The interface accepts one or more criterion for screening data retrieved from the underlying physical memory. For example, the system may instruct the data object to retrieve all profiles having ratings for a particular item in excess of "5." Alternatively, the system could instruct the data object to return the profiles of all users younger than 21. The data object receives the criterion and can accomplish the screen by accessing all the profile information stored in the associated physical memory, applying the requested criterion, and providing the system with any profile that passes. Alternatively, the data object could use some other algorithm for screening the data, such as running an SQL search on a stored table, or storing the profile data in a tree structure or hash table which allows the physical memory to be efficiently searched.

The "criterion" feature just described is an explication of one of the advantages of the data object described. The system does not need to specify physical memory addresses to access profile data. The system specifies a profile, or set of profiles, it desires to transfer by reference to profile information. For example, the data object accepts desired profile information from the system (which includes name data, some item of demographic information, rating information, or some set of this information) and implements the physical memory transfer.

The link identifies another data object to be accessed if the data request cannot be satisfied by the underlying physical memory. For example, a data object representing random access memory may be accessed to retrieve user profiles having a state address equal to "Massachusetts." If no user profiles stored in the underlying physical memory match the provided criterion, the link, which identifies another data object, is followed. If the link identifies another data object, i.e. if the link is not a null pointer, the system attempts to fulfill its request from the data object identified by the link. If, in turn, the request cannot be satisfied by the second-identified data object, and the second-identified data object is linked to a third data object, the system attempts to fulfill its request from the third-identified data object. This process continues until a "null" link is encountered.

The link can be used to arrange the data objects into a hierarchy which corresponds to the order in which the system accesses memory. For example, the system may be provided with a "cache" data object that is linked to a "main memory" data object, which is in turn linked to a "disk" memory object that is itself linked to a "network." Thus, a system would issue a "retrieve profile" request to the "cache" data object with a criterion of "name=john_smith". If the cache memory is unable to satisfy this request, it is presented to the next data object in the hierarchy, i.e. the "main memory" data object. If the request is satisfied from main memory, the user profile is returned to the cache, which can then satisfy the data request. The hierarchy of data objects provided by the links can be set up once for a given system or the links may be dynamically rearranged. If the links are set up in a static fashion, they may be specified by a configuration file or, in some applications, the links may be hardcoded. Dynamic reconfiguration of the links provides a system with the ability to reconfigure its memory hierarchy in response to run-time failures, e.g. a hard drive crash.

When a lower-level data object in the hierarchy satisfies a request that was not able to be fulfilled by a higher-level data object in the hierarchy, the lowerlevel object returns the result to the next higher-level data object. The higherlevel data object writes the result into its underlying physical memory, and returns the result to another higher-level data object, if necessary. In this manner, memory may be accessed in a hierarchical, isolated manner and data can be transparently distributed to the most efficient level of memory.

In some embodiments it may be desirable to provide a data object with "batch" capability, i.e. the data object will retrieve more data than requested in an attempt to increase performance. This capability may be provided as a flag that, when set, indicates that the data object should retrieve more data than requested. Alternatively, the data object may be provided with a function or subroutine which indicates to the data object when and how much should be retrieved in various situations, or the data object may accept input (e.g. in the form of a passed parameter) from the system instructing it to initiate a batch transfer. For example, a data object may be provided with logic that examines requests and, if the request is one for a user profile, initiates an access of four user profiles. The amount and frequency of such "look-ahead" memory accessing may be varied in order to advantageously take advantage of physical memory characteristics, such as latency and size.

Whether a hierarchical, isolated data store such as the one described above is provided or not, the user profiles are accessed in order to calculate a similarity factor for each user with respect to all other users (step 104). A similarity factor represents the degree of correlation between any two users with respect to a set of items. The calculation to be performed may be selected such that the more two users correlate, the closer the similarity factor is to zero. Specialized hardware may be provided for calculating the similarity factors between users, although it is preferred to provide a general-purpose computer with appropriate programming to calculate the similarity factors.

Whenever a rating is received from a user or is inferred by the system from that user's behavior, the profile of that user may be updated as well as the profile of the item rated. Profile updates may be stored in a temporary memory location and entered at a convenient time or profiles may be updated whenever a new rating is entered by or inferred for that user. Profiles can be updated by appending a new n-tuple of values to the set of already existing n-tuples in the profile or, if the new rating is a change to an existing rating, overwriting the appropriate entry in the user profile. Updating a profile also requires re-computation of any profile entries that are based on other information in the profile.

Whenever a user's profile is updated with new rating-item n-tuple, new similarity factors between the user and other users of this system may be calculated. In other embodiments, similarity factors are periodically recalculated, or recalculated in response to some other stimulus, such as a change in a neighboring user's profile. The similarity factor for a user may be calculated by comparing that user's profile with the profile of every other user of the system. This is computationally intensive, since the order of computation for calculating similarity factors in this manner is $n^2$, where n is the number of users of the system. It is possible to reduce the computational load associated with recalculating similarity factors in embodiments that store item profiles by first retrieving the profiles of the newly-rated item and determining which other users have already rated that item. The similarity factors between the newly-rating user and the users that have already rated the item are the only similarity factors updated.

Any number of methods can be used to calculate the similarity factors. In general, a method for calculating similarity factors between users should minimize the deviation between a predicted rating for an item and the rating a user would actually have given the item.

It is also desirable to reduce error in cases involving "extreme" ratings. That is, a method which predicts fairly well for item ratings representing ambivalence towards an item but which does poorly for item ratings representing extreme enjoyment or extreme disappointment with an item is not useful for recommending items to users.

Similarity factors between users refers to any quantity which expresses the degree of correlation between two user's profiles for a particular set of items. The following methods for calculating the similarity factor are intended to be exemplary, and in no way exhaustive. Depending on the item domain, different methods will produce optimal results, since users in different domains may have different expectations for rating accuracy or speed of recommendations. Different methods may be used in a single domain, and, in some embodiments, the system allows users to select the method by which they want their similarity factors produced.

In the following description of methods, $D_{xy}$ represents the similarity factor calculated between two users, x and y. $H_{ix}$ represents the rating given to item i by user x, I represents all items in the database, and $c_{ix}$ is a Boolean quantity which is 1 if user x has rated item i and 0 if user x has not rated that item.

One method of calculating the similarity between a pair of users is to calculate the average squared difference between their ratings for mutually rated items. Thus, the similarity factor between user x and user y is calculated by subtracting, for each item rated by both users, the rating given to an item by user y from the rating given to that same item by user x and squaring the difference. The squared differences are summed and divided by the total number of items rated. This method is represented mathematically by the following expression:

$$D_{xy} = \frac{\sum_{i\, I} c_{ix} c_{iy} (H_{ix} - H_{iy})^2}{\sum_{i\, I} c_{ix} c_{iy}}$$

A similar method of calculating the similarity factor between a pair of users is to divide the sum of their squared rating differences by the number of items rated by both users raised to a power. This method is represented by the following mathematical expression:

$$D_{xy} = \frac{\sum_{i \in Cxy} (H_{ix} - H_{iy})^2}{|C_{xy}|^k}$$

where $|C_{xy}|$ represents the number of items rated by both users.

A third method for calculating the similarity factor between users attempts to factor into the calculation the degree of profile overlap, i.e. the number of items rated by both users compared to the total number of items rated by either one user or the other. Thus, for each item rated by both users, the rating given to an item by user y is subtracted from the rating given to that same item by user x. These differences are squared and then summed. The amount of profile overlap is taken into account by dividing the sum of squared rating differences by a quantity equal to the number of items mutually rated by the users subtracted from the sum of the number of items rated by user x and the number of items rated by users y. This method is expressed mathematically by:

$$D_{xy} = \frac{\sum_{i \in C_{xy}} (H_{ix} - H_{iy})^2}{\sum_{i \in I} c_{ix} + \sum_{i \in I} c_{iy} - |C_{xy}|}$$

where $|C_{xy}|$ represents the number of items mutually rated by users x and y.

In another embodiment, the similarity factor between two users is a Pearson r correlation coefficient. Alternatively, the similarity factor may be calculated by constraining the correlation coefficient with a predetermined average rating value, A. Using the constrained method, the correlation coefficient, which represents $D_{xy}$, is arrived at in the following manner. For each item rated by both users, A is subtracted from the rating given to the item by user x and the rating given to that same item by user y. Those differences are then multiplied. The summed product of rating differences is divided by the product of two sums. The first sum is the sum of the squared differences of the predefined average rating value, A, and the rating given to each item by user x. The second sum is the sum of the squared differences of the predefined average value, A, and the rating given to each item by user y. This method is expressed mathematically by:

$$D_{xy} = \frac{\sum_{i \in C_{xy}} (H_{ix} - A)(H_{iy} - A)}{\sum_{i \in U_x} (H_{ix} - A)^2 \sum_{i \in U_y} (H_{iy} - A)^2}$$

where $U_x$ represents all items rated by x, $U_y$ represents all items rated by y, and $C_{xy}$ represents all items rated by both x and y.

The additional information included in a n-tuple may also be used when calculating the similarity factor between two users. For example, the information may be considered separately in order to distinguish between users, e.g. if a user tends to rate items only at night and another user tends to rate items only during the day, the users may be considered dissimilar to some degree, regardless of the fact that they may have rated an identical set of items identically. Alternatively, if the additional information is being used as a confidence factor as described above, then the information may be used in at least two ways.

In one embodiment, only item ratings that have a confidence factor above a certain threshold are used in the methods described above to calculate similarity factors between users.

In a second embodiment, the respective confidence factors associated with ratings in each user's profile may be factored into each rating comparison. For example, if a first user has given an item a rating of "7" which has a high confidence factor, but a second user has given the same item a rating of "7" with a low confidence factor, the second user's rating may be "discounted." For example, the system may consider the second user as having a rating of "4" for the item instead of "7." Once ratings are appropriately "discounted", similarity factors can be calculated using any of the methods described above.

Regardless of the method used to generate them, or whether the additional information contained in the profiles is used, the similarity factors are used to select a plurality of users that have a high degree of correlation to a user (step 106). These users are called the user's "neighboring users." A user may be selected as a neighboring user if that user's similarity factor with respect to the requesting user is better than a predetermined threshold value, L. The threshold value, L, can be set to any value which improves the predictive capability of the method. In general, the value of L will change depending on the method used to calculate the similarity factors, the item domain, and the size of the number of ratings that have been entered. In another embodiment, a predetermined number of users are selected from the users having a similarity factor better than L, e.g. the top twenty-five users. For embodiments in which confidence factors are calculated for each user-user similarity factor, the neighboring users can be selected based on having both a threshold value less than L and a confidence factor higher than a second predetermined threshold.

In some embodiments, users are placed in the rating user's neighbor set based on considerations other than the similarity factor between the rating user and the user to be added to the set. For example, the additional information associated with item ratings may indicate that whenever user A has rated an item highly, User B has sampled that item and also liked it considerably. The system may assume that User B enjoys following the advice of User A. However, User A may not be selected for User B's neighbor set using the methods described above due to a number of reasons, including that there may be a number of users in excess of the threshold, L, which highly correlate with User B's profile. These highly correlated users will fill up User B's neighbor set regardless of their use in recommending new items to User B.

Alternatively, certain users may not be included in a neighbor set because their contribution is cumulative. For example, if a user's neighbor set already includes two users that have rated every Dim Sum restaurant in Boston, a third user that has rated only Dim Sum restaurants in Boston would be cumulative, regardless of the similarity factor calculated for that user, and another user who has rated different items in a different domain may be included instead.

Another embodiment in which neighbors may be chosen for a user based on the additional information stored in the user profiles concerns multi-domain settings. In these settings, a user may desire to explore a new domain of items. However, the user's neighbors may not have explored that domain sufficiently to provide the user with adequate recommendations for items to sample. In this situation, users may be selected for the exploring user's neighbor set based on various factors, such as the number of items they have rated in the domain which the user wants to explore. This may be done on the assumption that a user that has rated many items in a particular domain is an experienced guide to that domain.

A user's neighboring user set should be updated each time that a new rating is entered by, or inferred for, that user. In many applications it is desirable to reduce the amount of computation required to maintain the appropriate set of neighboring users by limiting the number of user profiles consulted to create the set of neighboring users. In one embodiment, instead of updating the similarity factors between a rating user and every other user of the system (which has computational order of $n^2$), only the similarity factors between the rating user and the rating user's neighbors, as well as the similarity factors between the rating user and the neighbors of the rating user's neighbors are updated. This limits the number of user profiles which must be compared to $m^2$ minus any degree of user overlap between the neighbor sets where m is a number smaller than n. In this embodiment, similar users are selected in any manner as described above, such as a similarity factor threshold, a combined similarity factor-confidence factor threshold, or solely on the basis of additional information contained in user profiles.

Once a set of neighboring users is chosen, a weight is assigned to each of the neighboring users (step 108). In one embodiment, the weights are assigned by subtracting the similarity factor calculated for each neighboring user from the threshold value and dividing by the threshold value. This provides a user weight that is higher, i.e. closer to one, when the similarity factor between two users is smaller. Thus, similar users are weighted more heavily than other, less similar, users. In other embodiments, the confidence factor can be used as the weight for the neighboring users. Users that are placed into a neighbor set on the basis of other information, i.e. "reputation" or experience in a particular domain, may have an appropriate weight selected for them. For example, if a user is selected because of their experience with a particular domain, that user may be weighted very highly since it is assumed that they have much experience with the items to be recommended. The weights assigned to such users may be adjusted accordingly to enhance the recommendations given to the user.

Once weights are assigned to the neighboring users, an item is recommended to a user (step 110). For applications in which positive item recommendations are desired, items are recommended if the user's neighboring users have also rated the item highly. For an application desiring to warn users away from items, items are displayed as recommended against when the user's neighboring users have also given poor ratings to the item. Once again, although specialized hardware may be provided to select and weight neighboring users, an appropriately programmed general-purpose computer may provide these functions.

Figure 2:
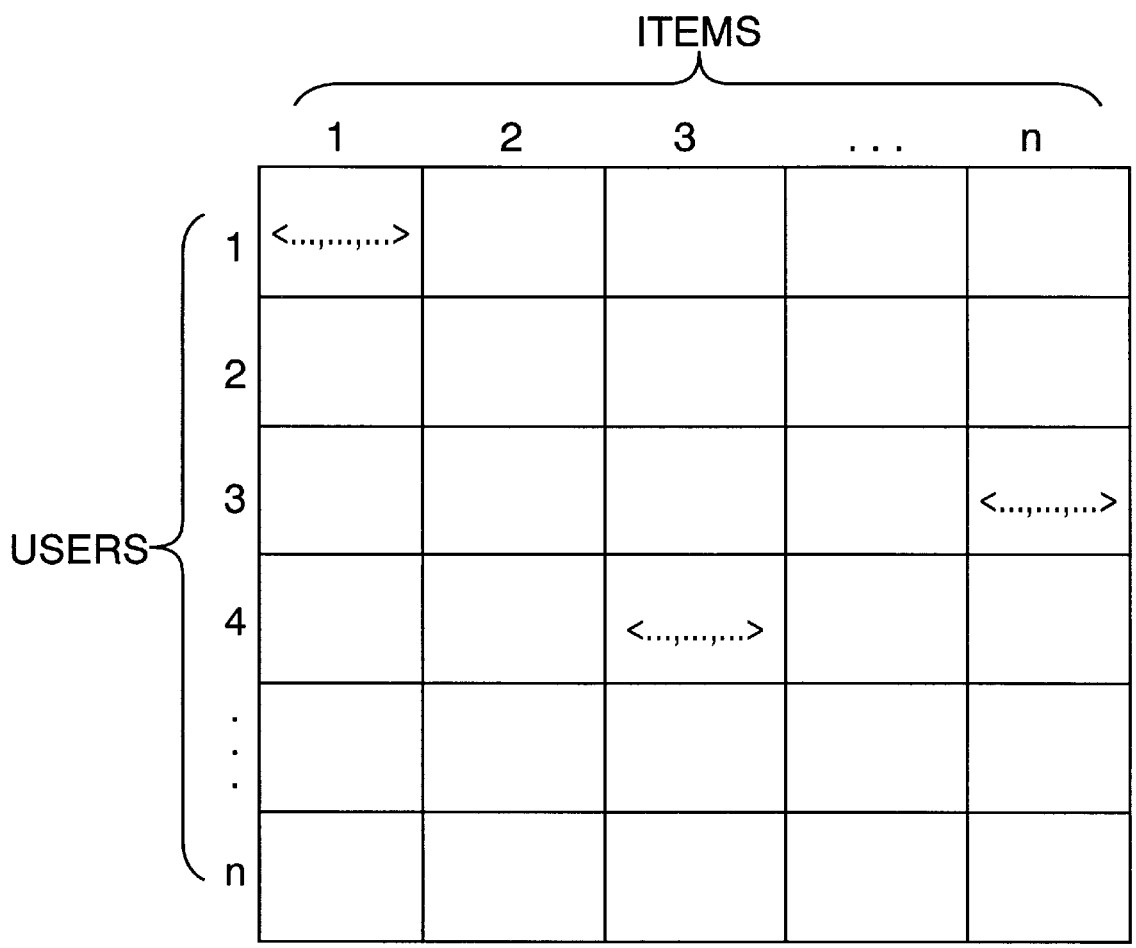
FIG. 2 is a diagrammatic view of a user profile-item profile matrix.

Referring to both FIGS. 1 and 2, the method just described can be further optimized for data sets having a large number of items, a large number of users, or both. In general, the profile matrix shown in FIG. 2 will be a sparse matrix for data sets having a large number of items or users. Since, as described above, it is desirable to reduce computational load on the system by first accessing item profiles to determine a set of users that have rated the item, the matrix of FIG. 2 could be accessed in one of two ways. Each user profile could be accessed to determine if the user represented by that row has rated the item, a list of users that have rated the item could be generated, and that list of users would determine which of the newly-rating user's similarity factors should be updated. Alternatively, an item column could be accessed to determine which user's have rated the item and, therefore, which of the newly-rating user's similarity factors must be updated.

In systems servicing a large number of users, however, contention for profile matrix data can become acute. This results from the retrieval patterns of the similarity factor algorithms described above. First, an item profile is accessed to determine which users have rated an item. Once the users that have previously rated the item are determined, each of their user profiles must be accessed so that the similarity factor between the newly-rating user and each of the previously-rating users can be calculated. If the profile data is provided only as a set of user n-tuples, the first step of accessing item profiles is not efficient, since each user n-tuple must be accessed to generate a list of users that have rated an item. Similarly, if the profile data is provided only as a set of item n-tuples, then the next step of accessing user profiles is inefficient, since each item profile must be accessed to determine which users have rated the item.

In order to efficiently service a system having a large number of items or a large number of users, it is desirable to store both a set of user n-tuples and a set of item n-tuples. User n-tuples are accessed whenever information related to how the user has rated items in the domain is required, and item n-tuples are accessed whenever information related to how users have rated the item is required. This also allows the item profile data to be accessed concurrently from the user profile data. As noted above, the n-tuples may store rating information or they may store pointers to rating information.

In some embodiments it is useful to store the respective sets of n-tuples on separate servers in order to provide a degree of fault tolerance. In order to further increase efficiency, user n-tuples may be stored on first collection of servers which act as a distributed, shared database for user n-tuples and item n-tuples may be stored on a second collection of servers which act as a shared, distributed database for item n-tuples.

An example of how such a system would operate follows. A first user submits a rating for a first item. The new rating information is stored both in the user's n-tuple and the item's n-tuple. In order to update the first user's similarity factors, the system accesses that item's profile and determines that 3,775 other users of the system have also rated that item. The system begins updating the first user's similarity factors by retrieving the first user's profile as well as the profile of one of the 3,775 users of the system that have already rated the item. The updated similarity factor between these two users is calculated using any of the methods described above. While the system is updating the first user's similarity factors, a second user submits a rating for a second item. The system stores the new rating information in both the second user's n-tuple as well as the second item's n-tuple, and accesses the second item's profile. This can be done simultaneously with the system accessing another user profile, because the data is stored as separate sets of n-tuples, as described above.

While the system is calculating the new similarity factors for the first two users, the system determines that similarity factors for a third user need to be updated. When the system attempts to access the item profiles to determine other users to use in calculating similarity factors, however, the system is unable to access them because the server hosting the item profile data has crashed. The system redirects its request for the item profiles to the server hosting the user n-tuple data. This allows the system to continue operation, even though this method of generating the item profile information is less efficient. As noted above, multiple servers may host user or item n-tuples in order to minimize the frequency of this occurrence.

Concept information may also be used to generate item—item similarity metrics, which are used to respond to a user request to identify other items that are similar to an item the user has sampled and enjoyed. Since each item has a concept mask which identifies to which concepts it belongs, item—item similarity metrics may be generated responsive to item concept mask overlaps. For example, if each of two items belong to five concepts, and two of the five concepts are overlapping, i.e. both items belong to those two, a degree of item overlap may be calculated by dividing the number of overlapping concepts, in this example two, by the total number of concepts to which both item belong, in this example 10. The actual method of arriving at a value for item concept mask overlap will vary depending on various factors such as domain, number of items, number of concepts, and others.

Another method for generating an item—item similarity metric is to determine the similarity of ratings given by users to both items. In general, rating similarity is determined using the same techniques as described above in relation to similarity factors for each user that has rated both items. The item—item opinion similarity metric may be a single number, as described above in relation to automated collaborative filtering, or it may be concept-based, i.e. an item may have an item—item opinion similarity metric which consists of a vector of similarity factors calculated on a per-concept basis. In other embodiments both the concept overlap metric and the opinion similarity metric may be used together, generally in any manner that further refines the accuracy of the recommendation process. The item to be recommended may be selected in any fashion, so long as the ratings of the neighboring users, their assigned weights, and the confidence factors, if any, are taken into account. In one embodiment, a rating is predicted for each item that has not yet been rated by the user. This predicted rating can be arrived at by taking a weighted average of the ratings given to those items by the user's neighboring users. A predetermined number of items may then be recommended to the user based on the predicted ratings.

Recommendations may also be generated using the additional information associated with the user ratings or the confidence factors associated with the similarity factors calculated between a user and the user's neighbors. For example, the additional information may be used to discount the rating given to items. In this embodiment, the additional information may indicate that a rating is possibly invalid or old, and could result in that rating being weighted less than other ratings. The additional information may be expressed as a confidence factor and, in this embodiment, items are recommended only if the user's neighboring user both recommends them highly and there is a high confidence factor associated with that user's rating of the item.

The predetermined number of items to recommend can be selected such that those items having the highest predicted rating are recommended to the user or the predetermined number of items may be selected based on having the lowest predicted rating of all the items. Alternatively, if a system has a large number of items from which to select items to recommend, confidence factors can be used to limit the amount of computation required by the system to generate recommendation. For example, the system can select the first predetermined number of items that are highly rated by the user's neighbors for which the confidence factor is above a certain threshold.

Recommendations can take any of a number of forms. For example, recommended items may be output as a list, either printed on paper by a printer, visually displayed on a display screen, or read aloud.

The user may also select an item for which a predicted rating is desired. A rating that the user would assign to the item can be predicted by taking a weighted average of the ratings given to that item by the user's neighboring users.

Information about the recommended items can be displayed to the user. For example, in a music domain, the system may display a list of recommended albums including the name of the recording artist, the name of the album, the record label which made the album, the producer of the album, "hit" songs on the album, and other information. In the embodiment in which the user selects an item and a rating is predicted for that item, the system may display the actual rating predicted, or a label representing the predicted rating. For example, instead of displaying 6.8 out of a possible 7.0 for the predicted rating, a system may instead display "highly recommended". Embodiments in which a confidence factor is calculated for each prediction may display that information to the user, either as a number or a label. For example, the system may display "highly recommended—85% confidence" or it may display "highly recommended—very sure."

In one embodiment, items are grouped in order to help predict ratings and increase recommendation certainty. For example, in the broad domain of music, recordings may be grouped according to various genres, such as "opera," "pop," "rock," and others. Groups, or "concepts," are used to improve performance because predictions and recommendations for a particular item may be made based only on the ratings given to other items within the same group. Groups may be determined based on information entered by the users, however it is currently preferred to generate the groups using the item data itself.

Generating the groups using the item data itself can be done in any manner which groups items together based on some differentiating feature. For example, in the item domain of music recordings, groups could be generated corresponding to "pop," "opera," and others.

A particular way to generate groups begins by randomly assigning all items in the database to a number of groups. The number of desired groups can be predetermined or random. For each initial group, the centroid of the ratings for items assigned to that group are calculated. This can be done by any method that determines the approximate mean value of the spectrum of ratings contained in the item profiles assigned to the initial group, such as eigenanalysis. It is currently preferred is to average all values present in the initial group.

After calculating the group centroids, determine to which group centroid each item is closest, and move it to that group. Whenever an item is moved in this manner, recalculate the centroids for the affected groups. Iterate until the distance between all group centroids and items assigned to each group are below a predetermined threshold or until a certain number of iterations have been accomplished.

Groups, or concepts, may be deduced from item information, as described above, or the system may define a set of concepts based on a predetermined standard. For example, a system providing movie recommendations may elect to use a set of concepts which correspond to established movie genres. Concepts may be used to improve the recommendation accuracy of the system in the manner described below.

Each item in the domain has at least one, and perhaps many, concepts with which it is associated. For example, a movie may be associated with both a "romantic" concept and a "comedy" concept. Items can be associated with concepts by an item-to-concept map, which consists of a list of all the concepts, each of which is associated with a list of items that belong to that concept. In some embodiments it may be desirable to place an upper limit on the number of concepts with which an item may be associated.

Each user of the system has a number of interests that is represented by a "concept mask." A concept mask can be generated by examining the user's profile, i.e. the items the user has rated and the ratings the user has given to those items. A user's concept mask can be implemented as any data object that associates the user with one or more concepts, such as an array or a linked list. Since each item is associated with one or more concepts, each rating given to an item by a user indicates some interest in the concepts with which that item is associated. A user's concept mask can be generated by taking into account the items that the user has rated and the ratings given to the items.

In one embodiment, each rating given to an item by the user increases the value of any concept associated with which the rated item is associated, i.e. the value for any concept is the sum of ratings given by the user to individual items which belong to the concept. For example, a user rates two items. The first item is associated with concepts A, B, and C and the user has assigned a rating of "3" to this item. The second item is associated with concepts B, C, and D and the user has assigned a rating of "7" to this item. The list of concepts from which the user's concept mask could be generated would include A, B, C, and D, and concept A would be assigned a value of three, concept B would be assigned a value of ten, concept C would be assigned a value of ten, and concept D would be assigned a value of seven. In some embodiments these values may be treated as weights which signify the importance a user assigns to a concept, i.e. the degree of interest the user has in a particular concept. The actual method of generating user concept masks will vary depending on the application, the domain, or the number of features present in the system. In general, any method of generating concept masks that takes into account, in a meaningful way, the ratings assigned to items by the user will generate an acceptable concept mask.

A user's concept mask may include every concept with which items rated by the user are associated, or only the highest valued concepts may be used. Using the example above, the user's concept mask may include concepts A, B, C, and D, or it may only include concepts B and C, since they were the highest valued concepts. Alternatively, a predetermined upper limit can be set on the number of concepts in which a user may have an interest in order to simply the domain space. The actual method for selecting concepts for the user concept mask will vary depending on the application and the domain. Succinctly, a user's concept mask identifies a set of concepts in which the user is interested and an item's concept mask identifies a set of concepts to which the item belongs.

The user's concept mask is stored in addition to the item-rating n-tuples described above. For simplicity, whenever reference is made to a "user profile," it should be understood to refer to rating-item n-tuples as well as concept information. Referring once again to FIG. 1, user profiles are accessed in order to calculate a similarity factor for each user with respect to all users (step 104). In a system employing concepts, or grouping of items, within a domain, similarity factors between users can be provided on a per-concept, i.e. per-group, basis. That is, a similarity factor between two users consists of a vector of entries, each entry representing a similarity factor between those two users for a group of items, or concepts, in which they both have an interest. For example, two users having five concepts in each of their concept masks would have a similarity factor with respect to the other user that would have five values, one for each concept. If one of the two users had a concept in his or her concept mask that the other user did not, then no similarity factor for that concept could be calculated for those two users. The per-concept similarity factors may be calculated using any of the methods described earlier, except that only items which belong to the concept for which the similarity factor is generated will be used.

As above, similarity factors between users may be recalculated when new ratings are received for items, periodically, or in response to some other stimulus. Similarly, any of the methods described above to reduce computational load while calculating similarity factors may also be advantageously used in these embodiments. If a similarity factor calculated between two users for a specific concept is negative, then it may be ignored. The similarity factor could be explicitly set to zero, i.e. "zeroed out," or the similarity factor could simply be ignored, i.e. it could be assigned a weight of zero. Assigning a negative similarity factor a weight of zero, instead of explicitly setting it to zero, would allow the similarity factor to be used in special cases, such as the case of warning the user away from certain items. Weights associated with concepts in a user's concept mask may be used to weight individual concept similarity factors in the similarity factor vector.

Once similarity factor vectors have been calculated, a set of neighboring users must be selected (step 106). The set of neighboring users is selected using any method which takes into account the similarity factor vectors. A user's neighboring user set may be populated responsive to the amount of overlap between two users' concept masks, the number of items which they have rated similarly in any concept they have in common, or both. For example, neighbors may be selected by summing the individual entries in the similarity factor vector calculated for each user. The user's having the greatest total could form the user's neighbor set. In general, any method for selecting neighbors that uses the similarity factor vector information in some meaningful way will result in an appropriate selection of neighbors, and whatever method is used may be adjusted from time to time to increase recommendation accuracy.

Additionally, users may be placed in the rating users neighbor set based on considerations other than the similarity factor vector between the users. Alternatively, certain users may not be included in a neighbor set because their contribution to the set is cumulative. For example, if a user's neighbor set already includes two users that have a high degree of concept overlap with respect to three concepts, but no concept overlap with respect to a fourth concept, it would be desirable to include a user in the neighboring user set which has a concept overlap with respect to the fourth concept rather than another user that has a high-degree of concept overlap with the first, second, or third concepts.

Once the set of neighboring users is chosen, a weight is assigned to each of the users in the neighboring user set (step 108). Weights may be assigned responsive to the amount of concept overlap between the users, the amount of rating similarity between the users for items in overlapping concepts, or both. For example, in the example above users were selected as neighbors based on the sum of their similarity factor vector entries; these totals could be normalized to produce a weight for each neighboring user, i.e. the user having the highest total would be given a weight of one, the next highest user would have weight slightly less than one, etc. Users that are placed into a neighbor set on the basis of experience in a particular grouping of items, i.e. concept, may have an appropriate weight selected for them.

Recommendations may be generated for all items in a domain, or only for a particular group of items. Recommendations for items within a particular group or concept of items are accomplished in the same way as described above, the main difference being that only ratings assigned to items within the group by users in the neighboring user set will be used to calculate the similarity factor.

For embodiments in which recommendations will be made for any item in the domain, the system performs an intersection of the set of items rated by all of the neighboring users with the set of items that belong to the concepts included in the concept mask of the user for which the recommendation will be generated. Once the intersection set has been generated, an item or items to be recommended is selected from the set, taking into account the ratings given to the item by the neighboring users, the weights assigned to the neighboring users, and any additional information that may be included. For a particular item, only the user's neighboring users that have rated the item are taken into account, although if only a small number of neighboring users have rated the item, this information may be used to "discount" the recommendation score generated. Similarly, any weighting assigned to particular concepts present in the user's concept mask or any additional information or confidence factors associated with the similarity factor vectors may also be used to discount any recommendation score generated. The number of items to recommend may be determined using any of the methods described above.

As described above, the user may request that the system predict a rating for a selected item. The rating is predicted by taking a weighted average of the rating given to that item by the users in the neighboring user set, and concept mask techniques just described may be used in addition to the method described above to further refine the predicted rating.

Whether or not grouping is used, a user or set or users may be recommended to a user as having similar taste in items of a certain group. In this case, the similarity factors calculated from the user profiles and item profiles are used to match similar users and introduce them to each other. This is done by recommending one user to another in much the same way that an item is recommended to a user. It is possible to increase the recommendation certainty by including the number of items rated by both users in addition to the similarity factors calculated for the users.

The user profiles and, if provided, item profiles may be used to allow communication to be targeted to specific users that will be most receptive to the communication. This may be done in at least two ways.

In a first embodiment, a communication is provided which is intended to be delivered to users that have rated a particular item or set of items highly. In this embodiment, if the communication is to be targeted at users that have rated a particular item highly, then the profile for that item is retrieved from memory and users which have rated the item highly are determined. The determination of users that have rated the item highly may be done in any number of ways, for example, a threshold value may be set and users which have given a rating for the item in excess of that threshold value would be selected as targeted users.

Alternatively, if the communication is to be targeted at users that have rated a set of items highly, then each profile for each item that is to be considered can be retrieved from the memory element and a composite rating of items may be produced for each user. The composite rating may be a weighted average of the individual ratings given to the items by a user; each item may be weighted equally with all the other items or a predetermined weight may be assigned to each individual item. In this embodiment, once a composite rating for each user has been determined, then targeted users are selected. This selection may be done by setting a predetermined threshold which, when a user's composite rating is in excess of, indicates that user is a targeted user.

In either embodiment, once targeted users are selected, the communication is displayed on that user's screen whenever the user accesses the system. In other embodiments the communication may be a facsimile message, an electronic mail message, or an audio message.

In a second embodiment, the communication which is to be targeted to selected users may seek out its own receptive users based on information stored in the user profiles and ratings given to the communication by users of the system. In this embodiment, the communication initially selects a set of users to which it presents itself. The initial selection of users may be done randomly, or the communication may be "preseeded" with a user profile which is its initial target.

Once a communication presents itself to a user or set of users, it requests a rating from that user or users. Users may then assign a rating to the communication in any of the ways described above. Once a communication receives a rating or ratings from users, the communication determines a new set of users to which it presents itself based on the received rating. One way the communication does this is to choose the neighbors of users that have rated it highly. In another embodiment, the communication analyzes the ratings it has received to determine the ideal user profile for a hypothetical user in the second set of users to which it will present itself. The communication does this by retrieving from memory the user profiles of each user that has given it a rating. The communication then analyzes those user profiles to determine characteristics associated with users that have given it a favorable rating.

The communication may assume that it can infer more from looking at items that users have rated favorably or it may instead attempt to gather information based on items that those users have rated unfavorably. Alternatively, some selection of items in a group may be used to determine characteristics of favorable user profiles. In this embodiment, the communication may perform a similarity factor calculation using any of the methods described above. The set of neighboring users is the set of users to which the communication will present itself.

Once the communication has presented itself to the second set of users, the series of steps repeats with the new users rating the communication and the communication using that information to further refine its ideal user to which it will present itself. In some embodiments, a limit may be placed the number of users to which a communication may present itself in the form of tokens which the communication spends to present itself to a user, perform a similarity factor calculation, or other activities on the system. For example, a communication may begin with a certain number of tokens. For each user that it presents itself to, the communication must spend a token. The communication may be rewarded for users who rate it highly by receiving more tokens from the system than it had to pay to present itself to that user. Also, a communication may be penalized for presenting itself to users who give it a low rating. This penalty may take the form of a required payment of additional tokens or the communication may simply not receive tokens for the poor rating given to it by the user. Once the communication is out of tokens, it is no longer active on the system.

Grouping, or subdividing the domain into concepts, as described above, is a special case of "feature-guided automated collaborative filtering" when there is only a limited number of features of interest. The method of the present invention works equally well for item domains in which the items have many features of interest, such as World Wide Web pages.

The method using feature-guided automated collaborative filtering incorporates feature values associated with items in the domain. The term "feature value" is used to describe any information stored about a particular feature of the item. For example, a feature may have boolean feature values indicating whether or not a particular feature exists or does not exist in a particular item.

Alternatively, features may have numerous values, such as terms appearing as "keywords" in a document. In some embodiments, each feature value can be represented by a vector in some metric space, where each term of the vector corresponds to the mean score given by a user to items having the feature value.

Ideally, it is desirable to calculate a vector of distances between every pair of users, one for each possible feature value defined for an item. This may not be possible if the number of possible feature values is very large, i.e., keywords in a document, or the distribution of feature values is extremely sparse. Thus, in many applications, it is desirable to cluster feature values. The terms "cluster" and "feature value cluster" are used to indicate both individual feature values as well as feature value clusters, even though feature values may not necessarily be clustered.

Feature value clusters are created by defining a distance function $\Delta$, defined for any two points in the vector space, as well as vector combination function $\Omega$, which combines any two vectors in the space to produce a third point in the space that in some way represents the average of the points. Although not limited to the examples presented, three possible formulations of $\Delta$ and $\Omega$ are presented below.

The notion of similarity between any two feature values is how similarly they have been rated by the same user, across the whole spectrum of users and items. One method of defining the similarity between any two feature values is to take a simple average. Thus, we define the value $\vec{v}_I^{\alpha x}$ to be the mean of the rating given to each item containing feature value $FV_x^{60}$ that user i has rated. Expressed mathematically:

$$\vec{v}_I^{\alpha x} = \begin{cases} \dfrac{\Sigma_{p=1}^{\|Items\|}(R_{I,p} \times c_{I,p} \times \Gamma_p^{\alpha x})}{\Sigma_{p=1}^{\|Items\|}(c_{I,p} \times \Gamma_p^{\alpha x})} & \textit{iff}(\Sigma_{p=1}^{\|Items\|} c_{I,p} \times \Gamma_p^{\alpha x}) \geq 1 \\ \text{Undefined} & \text{otherwise} \end{cases}$$

Where $\Gamma_p^{\alpha x}$ indicates the presence or absence of feature value $FV_x^{\alpha}$ in item p. Any distance metric may be used to determine the per-user dimension squared distance between vectors feature value $\alpha_x$ and feature value $\alpha_y$ for user i. For example, any of the methods referred to above for calculating user similarity may be used.

Defining $\delta$ as the per-user dimension squared distance between two feature values, the total distance between the two feature value vectors is expressed mathematically as:

$$\Delta(\vec{FV}_x^{\alpha}, \vec{FV}_y^{\alpha}) = \sqrt{\left(\dfrac{\|Users\|}{\Sigma_{I=1}^{\|Users\|} \eta_I^{\alpha x} \times \eta_I^{\alpha y}}\right) \times \left(\sum_{I=1}^{\|Users\|} \delta_I^{\alpha xy}\right)}$$

where, the term $$\dfrac{\|Users\|}{\Sigma_{I=1}^{\|Users\|} \eta_I^{\alpha x} \times \eta_I^{\alpha y}}$$

represents adjustment for missing data.

The combination function for the two vectors, which represents a kind of average for the two vectors, is expressed mathematically by the following three equations.

$$\Omega(\vec{FV}_x^\alpha, \vec{FV}_y^\alpha) = \begin{cases} \dfrac{\vec{v}_I^{\alpha_x} + \vec{v}_I^{\alpha_y}}{2} & \text{if } \eta_I^{\alpha_x} = 1 \text{ and } \eta_I^{\alpha_y} = 1 \\ \vec{v}_I^{\alpha_x} & \text{if } \eta_I^{\alpha_x} = 1 \text{ and } \eta_I^{\alpha_y} = 0 \\ \vec{v}_I^{\alpha_y} & \text{if } \eta_I^{\alpha_x} = 0 \text{ and } \eta_I^{\alpha_y} = 1 \end{cases}$$

wherein $\eta_I^{\alpha_x}$ indicates whether $\vec{v}_I^{\alpha_x}$ is defined.

Another method for calculating the similarity between any two feature values is to assume the number of values used to compute $\vec{v}_I^{\alpha_x}$ is sufficiently large. If this assumption is made, the Central Limit Theorem can be used to justify approximating the distribution of vectors by a Gaussian distribution.

Since the Gaussian distribution can be effectively characterized by its mean, variance and sample size, each entry $\vec{v}_I^{\alpha_x}$ is now a triplet.

$$\vec{v}_I^{\alpha_x} = \langle \mu_I^{\alpha_x}, \sigma_I^{2\alpha_x}, N_I^{\alpha_x} \rangle$$

where $$\mu_I^{\alpha_x} = \frac{\sum_{p=1}^{\|Items\|}(R_{I,p} \times c_{I,p} \times \Gamma_p^{\alpha_x})}{\sum_{p=1}^{\|Items\|} c_{I,p} \times \Gamma_p^{\alpha_x}}$$

is the sample mean of the population, $$\sigma_I^{2\alpha_x} = \frac{\sum_{p=1}^{\|Items\|}((R_{I,p} - \mu_I^{\alpha_x})^2 \times c_{I,p} \times \Gamma_p^{\alpha_x})}{\sum_{p=1}^{\|Items\|}(c_{I,p} \times \Gamma_p^{\alpha_x})}$$

is the variance of the sampling distribution, and $$N_I^{\alpha_x} = \sum_{p=1}^{\|Items\|} (c_{I,p} \times \Gamma_p^{\alpha_x})$$

is the sample size.

The total distance between the two feature value vectors is expressed mathematically by:

$$\Delta(\vec{FV}_x^\alpha, \vec{FV}_y^\alpha) = \sqrt{\left(\frac{\|Users\|}{\sum_{I=1}^{\|Users\|} \eta_I^{\alpha_x} \times \eta_I^{\alpha_x}}\right) \times \left(\sum_{I=1}^{\|Users\|} \delta_I^{\alpha_{x,y}}\right)}$$

The feature value combination function combines the corresponding triplets from the two vectors by treating them as gaussians, and therefore is represented mathematically by:

$$\Omega(\vec{FV}_x^\alpha, \vec{FV}_y^\alpha) = \begin{cases} \langle \mu_I^{\alpha_{x,y'}}, \sigma_I^{2\alpha_{x,y'}}, N_I^{\alpha_{x,y'}} \rangle & \text{if } \eta_I^{\alpha_x} = 1 \text{ and } \eta_I^{\alpha_y} = 1 \\ \langle \mu_I^{\alpha_x}, \sigma_I^{2\alpha_x}, N_I^{\alpha_x} \rangle & \text{if } \eta_I^{\alpha_x} = 1 \text{ and } \eta_I^{\alpha_y} = 0 \\ \langle \mu_I^{\alpha_{x,y'}}, \sigma_I^{2\alpha_{x,y'}}, N_I^{\alpha_y} \rangle & \text{if } \eta_I^{\alpha_x} = 0 \text{ and } \eta_I^{\alpha_y} = 1 \end{cases}$$

where $$\mu_I^{\alpha_{x,y'}} = \frac{(N_I^{\alpha_x} \times \mu_I^{\alpha_x}) + (N_I^{\alpha_y} \times \mu_I^{\alpha_y})}{(N_I^{\alpha_x} + N_I^{\alpha_y})}$$

represents the mean of the new population, $$\sigma_I^{2\alpha_{x,y'}} = \left(\frac{(N_I^{\alpha_x} \times \sigma_I^{2\alpha_x}) + (N_I^{\alpha_y} \times \sigma_I^{2\alpha_y})}{(N_I^{\alpha_x} + N_I^{\alpha_y})}\right) + \left(\frac{(N_I^{\alpha_x} + N_I^{\alpha_y}) \times (\mu_I \alpha_y)^2}{(N_I^{\alpha_x} + N_I^{\alpha_y})^2}\right)$$

represents the variance of the combined population, and $$N_I^{\alpha_{x,y'}} = (N_I^{\alpha_x} + N_I^{\alpha_y})$$

represents the sample size of the combined population.

The third method of calculating feature value similarity metrics attempts to take into account the variance of the sampling distribution when the sample size of the population is small. A more accurate estimator of the population variance is given by the term $$S_I^{2\alpha_x} = \frac{\sum_{p=1}^{\|Items\|}((R_{I,p} - \mu_I^{\alpha_x})^2 \times c_{I,p} \times \Gamma_p^{\alpha_x})}{(\sum_{p=1}^{\|Items\|}(c_{I,p} \times \Gamma_p^{\alpha_x})) - 1}$$

and represents the sample variance, which is an accurate estimator of the underlying population variance.

Accordingly operator $\theta_I^{\alpha_x}$ is redefined as:

$$\eta_I^{\alpha_x} = \begin{cases} 1 & \text{if } (\sum_{p=1}^{\|Items\|} C_{I,p}/\Gamma_p^{\alpha_x}) > 1 \\ 0 & \text{Otherwise} \end{cases}$$

and the triplet is defined as:

$$\vec{v}_I^{\alpha_x} = \langle \mu_I^{\alpha_x}, S_I^{2\alpha_x}, N_I^{\alpha_x} \rangle$$

Given the above, the sample variance is represented as:

$$S_I^{2\alpha_x} = \frac{\sum_{p=1}^{\|Items\|}((R_{I,p} - \mu_I^{\alpha_x})^2 \times c_{I,p} \times \Gamma_p^{\alpha_x})}{N_I^{\alpha_x} - 1}$$

The sample variance and the variance of the sample distribution for a finite population are related by the following relationship:

$$\sigma^2 = \left(\frac{N-1}{N}\right) \times S^2$$

which transforms the standard deviation into:

$$\sigma_I^{2\alpha_{x,y'}} = \left(\frac{N_I^{\alpha_x} - 1}{(N_I^{\alpha_x})^2}\right) \times S_I^{2\alpha_x} + \left(\frac{N_I^{\alpha_y} - 1}{(N_I^{\alpha_y})^2}\right) \times S_I^{2\alpha_x}$$

Thus, the feature value vector combination function is defined as:

$$\Omega(\vec{FV}_x^\alpha, \vec{FV}_y^\alpha) = \begin{cases} \langle \mu_I^{\alpha_{x,y'}}, S_I^{2\alpha_{x,y'}}, N_I^{\alpha_{x,y'}} \rangle & \text{if } \eta_I^{\alpha_x} = 1 \text{ and } \eta_I^{\alpha_y} = 1 \\ \langle \mu_I^{\alpha_x}, S_I^{2\alpha_x}, N_I^{\alpha_x} \rangle & \text{if } \eta_I^{\alpha_x} = 1 \text{ and } \eta_I^{\alpha_y} = 0 \\ \langle \mu_I^{\alpha_{x,y'}}, S_I^{2\alpha_y}, N_I^{\alpha_y} \rangle & \text{if } \eta_I^{\alpha_x} = 0 \text{ and } \eta_I^{\alpha_y} = 1 \end{cases}$$

Regardless of the feature value combination function used, the item similarity metrics generated by them are used to generate feature value clusters. Feature value clusters are generated from the item similarity metrics using any clustering algorithm known in the art. For example, the method described above with respect to grouping items could be used to group values within each feature.

Feature values can be clustered both periodically and incrementally. Incremental clustering is necessary when the number of feature values for items is so large that reclustering of all feature values cannot be done conveniently. However, incremental clustering may be used for any set of items, and it is preferred to use both periodic reclustering and incremental reclustering.

All feature values are periodically reclustered using any clustering method known in the art, such as K-means. It is preferred that this is done infrequently, because of the time that may be required to complete such a reclustering. In order to cluster new feature values present in items new to the domain, feature values are incrementally clustered. New feature values present in the new items are clustered into the already existing feature value clusters. These feature values may or may not be reclustered into another feature value cluster when the next complete reclustering is done.

Figure 3:
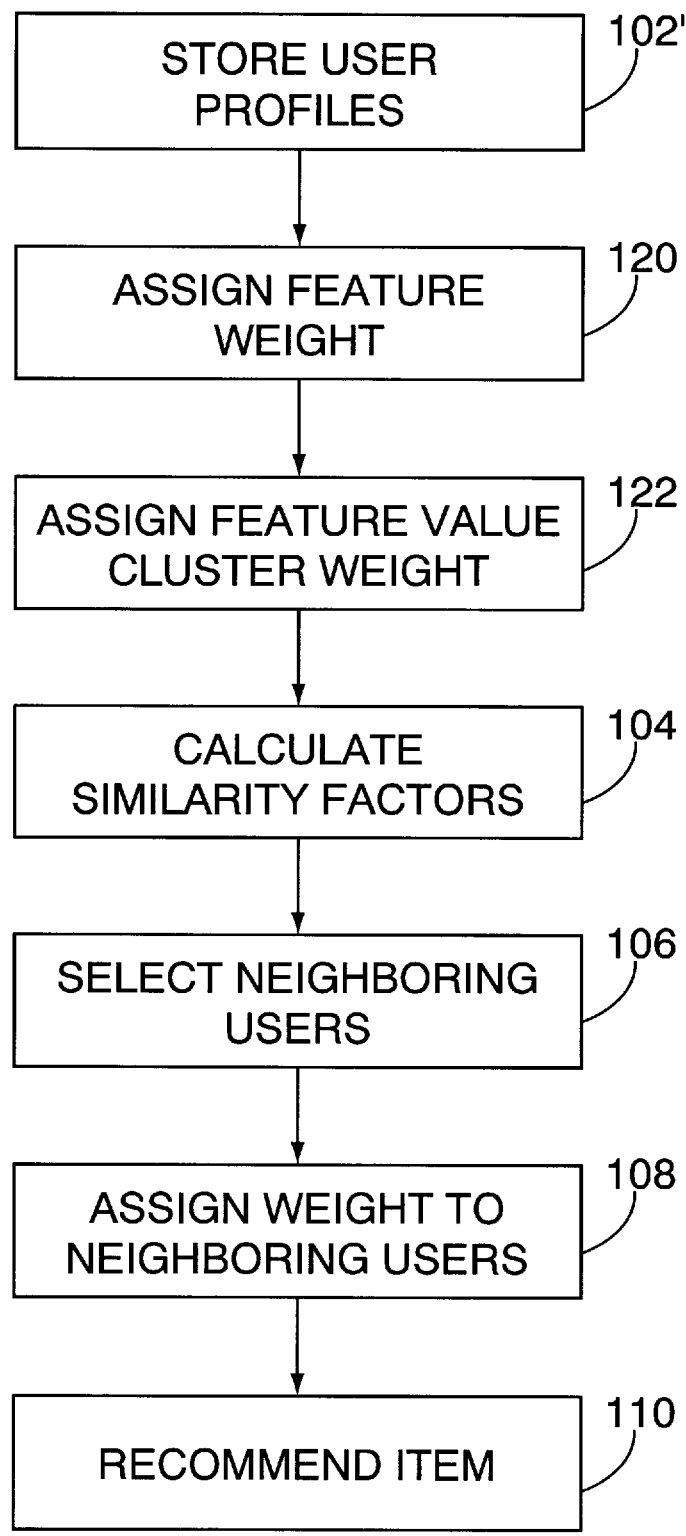
FIG. 3 is a flowchart of another embodiment of the method.

Using the feature value clusters generated by any one of the methods described above, a method for recommending an item, as shown in FIG. 3, uses feature clusters to aid in predicting ratings and proceeds as the method of FIG. 1, in that a plurality of user profiles is stored (step 102'). As above, a plurality of item profiles may also be stored. The method using feature value clusters assigns a weight to each feature value cluster and a weight to each feature based on the users rating of the item (steps 120 and 122).

A feature value cluster weight for each cluster is calculated for each user based on the user's ratings of items containing that cluster. The cluster weight is an indication of how important a particular user seems to find a particular feature value cluster. For example, a feature for an item in a music domain might be the identity of the producer. If a user rated highly all items having a particular producer (or cluster of producers), then the user appears to place great emphasis on that particular producer (feature value) or cluster of producers (feature value cluster).

Any method of assigning feature value cluster weight that takes into account the user's rating of the item and the existence of the feature value cluster for that item is sufficient, however, it is currently preferred to assign feature value cluster weights by summing all of the item ratings that a user has entered and dividing by the number of feature value clusters. Expressed mathematically, the vector weight for cluster x of feature $\alpha$ for user I is:

$$\vec{CW}_I^{\alpha_x} = \begin{cases} \dfrac{\sum\limits_{p=1}^{\|Items\|} R_{I,p} \times c_{I,p} \times \gamma_p^{\alpha_x}}{\sum\limits_{p=1}^{\|Items\|} c_{I,p} \times \gamma_p^{\alpha_x}} & \text{iff} \sum_{p=1}^{\|Items\|} c_{I,p} \times \gamma_p^{\alpha_x} \geq 1 \\ 0.0 & \text{otherwise} \end{cases}$$

where $\gamma_p^{\alpha_x}$ is a boolean operator indicating whether item p contains the feature value cluster x of feature $\alpha$.

The feature value cluster weight is used, in turn, to define a feature weight. The feature weight reflects the importance of that feature relative to the other features for a particular feature. Any method of estimating a feature weight can be used; for example, feature weights may be defined as the reciprocal of the number of features defined for all items. It is preferred that feature weights are defined as the standard deviation of all cluster weight divided by the means of all cluster weights. Expressed mathematically:

$$\vec{FW}_I^\alpha = \frac{\text{StandardDev}(\vec{CW}_I^\alpha)}{\text{Mean}(\vec{CW}_I^\alpha)}$$

The feature value cluster weights and the feature weights are used to calculate the similarity factor between two users. The similarity factor between two users may be calculated by any method that takes into account the assigned weights. For example, any of the methods for calculating the similarity between two users, as described above, may be used provided they are augmented by the feature weights and feature value weights. Thus $$D_{I,J} = \sum_{\alpha=1}^{\|FeaturesDefined\|} \vec{FW}_I^\alpha \times \left( \sum_{a_x=1}^{\|\alpha\|} \vec{D}_{I,J}^{\alpha_x} \times \vec{CW}_I^{\alpha_x} \times \tau^{\alpha_x(D_{I,J})} \right)$$

represents the similarity between users I and J, where $\tau^{\alpha_x}$ ($\vec{D}_{I,J}$) is a boolean operator on a vector of values indicating whether feature value cluster of x for feature $\alpha$ of the vector is defined and where $$D_{I,J} = \vec{CW}_I^{\alpha_x} =$$

$$\begin{cases} \dfrac{\sum_{p=1}^{\|Items\|}(R_{I,p}-R_{J,p})^2 \times c_{I,p} \times c_{J,p} \times \gamma_p^{\alpha_x}}{\sum_{p=1}^{\|Items\|} c_{I,p} \times \gamma_p^{\alpha_x}} & \text{iff} \sum_{p=1}^{\|Items\|} c_{I,p} \times \gamma_p^{\alpha_x} \geq 1 \\ 0.0 & \text{otherwise} \end{cases}$$

The representation of an item as a set of feature values allows the application of various feature-based similarity metrics between items. Two items may not share any identical feature values but still be considered quite similar to each other if they share some feature value clusters. This allows the recommendation of unrated items to a user based on the unrated items similarity to other items which the user has already rated highly.

The similarity between two items $p_1$ and $p_2$, where $P_1$ and $P_2$ represent the corresponding sets of feature values possessed by these items, can be represented as some function, f, of the following three sets: the number of common feature values shared by the two items; the number of feature values that $p_1$ possesses that $p_2$ does not; and the number of feature values that $p_2$ possesses that $p_1$ does not.

Thus, the similarity between two items, denoted by $S(p_1, p_2)$, is represented as:

$$S(p_1, p_2) = F(P_1 \cap P_2, P_1 - P_2, P_2 - P_1)$$

Each item is treated as a vector of feature value clusters and the item—item similarity metrics are defined as:

$$f(P_1 \cap P_2) = \sum_{\alpha=1}^{\|FeaturesDefined\|} \vec{FW}_I^\alpha \times \sum_{\alpha_x=1}^{\|\alpha\|} (\vec{CW}_I^{\alpha_x} \times \gamma_{P_1}^{\alpha_x} \times \gamma_{P_2}^{\alpha_x})$$

$$f(P_1 - P_2) = \sum_{\alpha=1}^{\|FeaturesDefined\|} \vec{FW}_I^\alpha \times \sum_{\alpha_x=1}^{\|\alpha\|} (\vec{CW}_I^{\alpha_x} \times \gamma_{P_1}^{\alpha_x} \times (1 - \gamma_{P_2}^{\alpha_x}))$$

$$f(P_2 - P_1) = \sum_{\alpha=1}^{\|FeaturesDefined\|} \vec{FW}_I^\alpha \times \sum_{\alpha_x=1}^{\|\alpha\|} (\vec{CW}_I^{\alpha_x} \times (1 - \gamma_{P_1}^{\alpha_x}) \times \gamma_{P_2}^{\alpha_x})$$

This metric is personalized to each user since the feature weights and cluster weights reflect the relative importance of a particular feature value to a user.

Another method of defining item—item similarity metrics attempts to take into account the case where one pair of items has numerous identical feature values, because if two items share a number of identical feature values, they are more similar to each other then two items that do not share feature values. Using this method, $f(P_1 \cap P_2)$ is defined as:

$$f(P_1 \cap P_2) = \sum_{\alpha=1}^{\|FeaturesDefined\|} \vec{FW_f^\alpha} \times \left( \sum_{\alpha_x=1}^{\|\alpha\|} (\vec{CW_f^{\alpha_x}} \times \gamma_{P_1}^{\alpha_x} \times \gamma_{P_2}^{\alpha_x}) + \sum_{i=1}^{\|FV^\alpha\|} (\Gamma_{P_1}^{\alpha_x} \times \Gamma_{P_2}^{\alpha_x}) \right)$$

Another method for calculating item—item similarity is to treat each item as a vector of feature value clusters and then compute the weighted dot product of the two vectors. Thus, $$S(p_1, p_2) = g(P_1 \cap P_2)$$

where $$g(P_1 \cap P_2) = \sum_{\alpha=1}^{\|FeaturesDefined\|} \vec{FW_f^\alpha} \times \sum_{\alpha_x=1}^{\|\alpha\|} (\vec{CW_f^{\alpha_x}} \times \gamma_{P_1}^{\alpha_x} \times \gamma_{P_2}^{\alpha_x})$$

In another aspect, the system and method may be used to identify users that will enjoy a particular item. In this aspect, as above, user profiles and item profiles are stored in a memory element, and the user profiles and item profiles record ratings given to items by users. An item profile contains at least an identification of a user and the rating given to that item by that user. The item profile may contain additional information just as described in connection with user profiles. Similarity factors between items are calculated using any of the methods described above. For example, using the squared difference method for calculating similarity factors, the rating given to a first item by User A and the rating given to a second item by User A are subtracted and that difference is squared. This is done for each user that has rated both items. The squared differences are then summed and divided by the total number of users that have rated both items.

This provides an item—item similarity metric and a group of neighboring items is selected in the same way as described above. Those neighboring items are then weighted and a user, or group of users, that will be receptive to a given item are determined. Again, this may be done using any of the methods described above, including using confidence factors, item grouping, or feature guided automated collaborative filtering.

The methods described above can be provided as software on any suitable medium that is readable by a computing device. The software programs means may be implemented in any suitable language such as, C, C++, PERL, LISP, ADA, assembly language or machine code. The suitable media may be any device capable of storing program means in a computer-readable fashion. such as a floppy disk, a hard disk, an optical disk, a CD-ROM, a magnetic tape, a memory card, or a removable magnetic drive.

Figure 4:
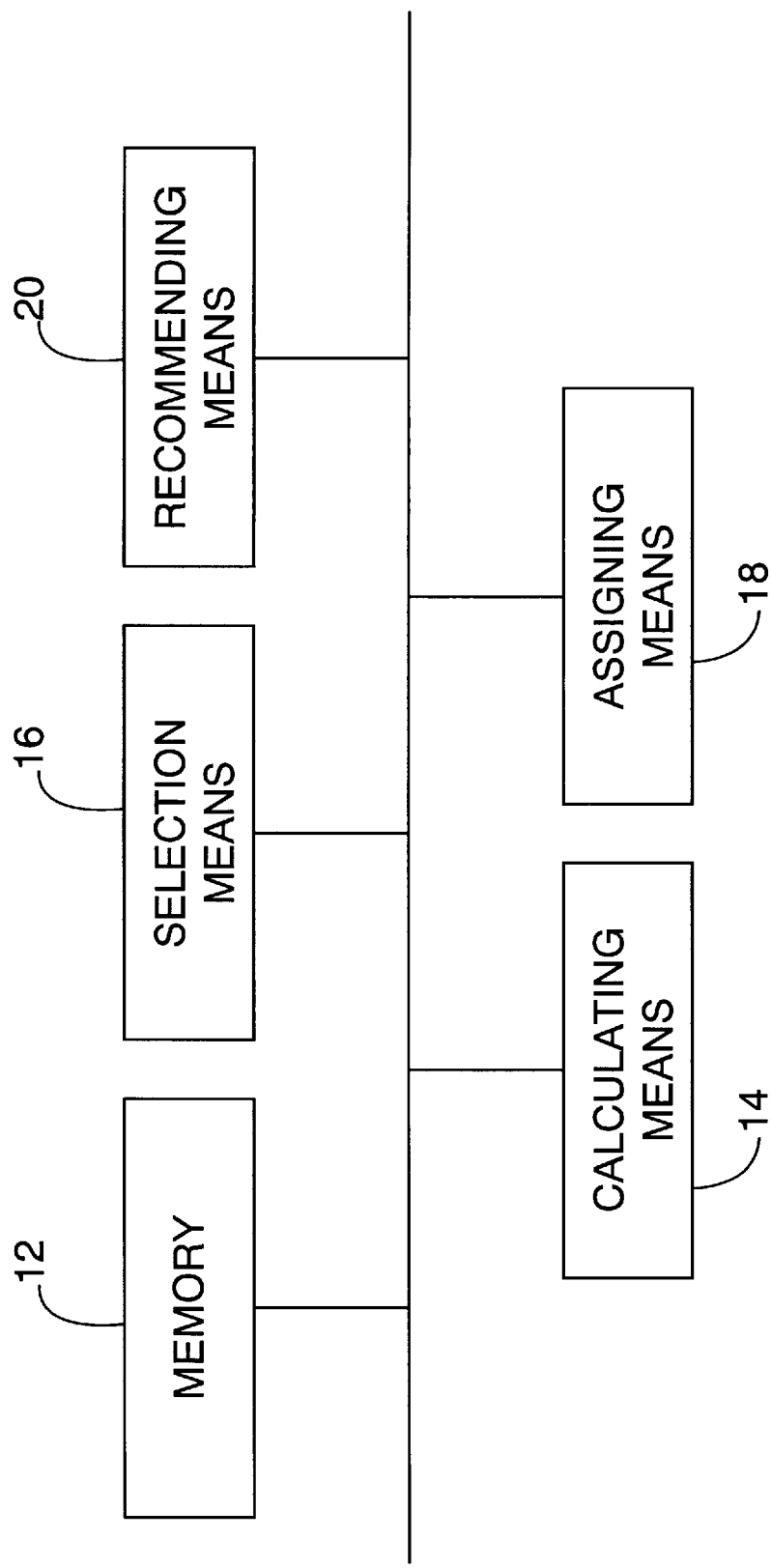
FIG. 4 is a block diagram of an embodiment of the apparatus.

An apparatus may be provided to recommend items to a user. The apparatus, as shown in FIG. 4 has a memory element 12 for storing user and item profiles. Memory element 12 can be any memory element capable of storing the profiles such as, RAM, EPROM, or magnetic media.

A means 14 for calculating is provided which calculates the similarity factors between users. Calculating means 14 may be specialized hardware to do the calculation or, alternatively, calculating means 14 may be a microprocessor or software running on a microprocessor resident in a general-purpose computer.

Means 16 for selecting is also provided to select neighboring users responsive to the similarity factors. Again, specialized hardware or a microprocessor may be provided to implement the selecting means 16, however preferred is to provide a software program running on a microprocessor resident in a general-purpose computer. Selecting means 16 may be a separate microprocessor from calculating means 14 or it may be the same microprocessor.

A means 18 for assigning a weight to each of the neighboring users is provided and can be specialized hardware, a separate microprocessor, the same microprocessor as calculating means 14 and selecting means 16, or a microprocessor resident in a general-purpose computer and running software.

In some embodiments a receiving means is included in the apparatus (not shown in FIG. 4). Receiving means is any device which receives ratings for items from users. The receiving means may be a keyboard or mouse connected to a personal computer. In some embodiments, an electronic mail system operating over a local are network or a wide area network forms the receiving means. In the preferred embodiment, a World Wide Web Page connected to the Internet forms the receiving means.

Also included in the apparatus is means 20 for recommending at least one of the items to the users based on the weights assigned to the users, neighboring users and the ratings given to the item by the users' neighboring users. Recommendation means 20 may be specialized hardware, a microprocessor, or, as above, a microprocessor running software and resident on a general-purpose computer. Recommendation means 20 may also comprise an output device such as a display, audio output, or printed output.

In another embodiment an apparatus for recommending an item is provided that uses feature weights and feature value weights. This apparatus is similar to the one described above except that it also includes a means for assigning a feature value cluster weight 22 and a means for assigning a feature weight 24 (not shown in FIG. 4). Feature value cluster weight assigning means 22 and feature value weight assigning means 24 may be provided as specialized hardware, a separate microprocessor, the same microprocessor as the other means, or as a single microprocessor in a general purpose computer.

Figure 5:
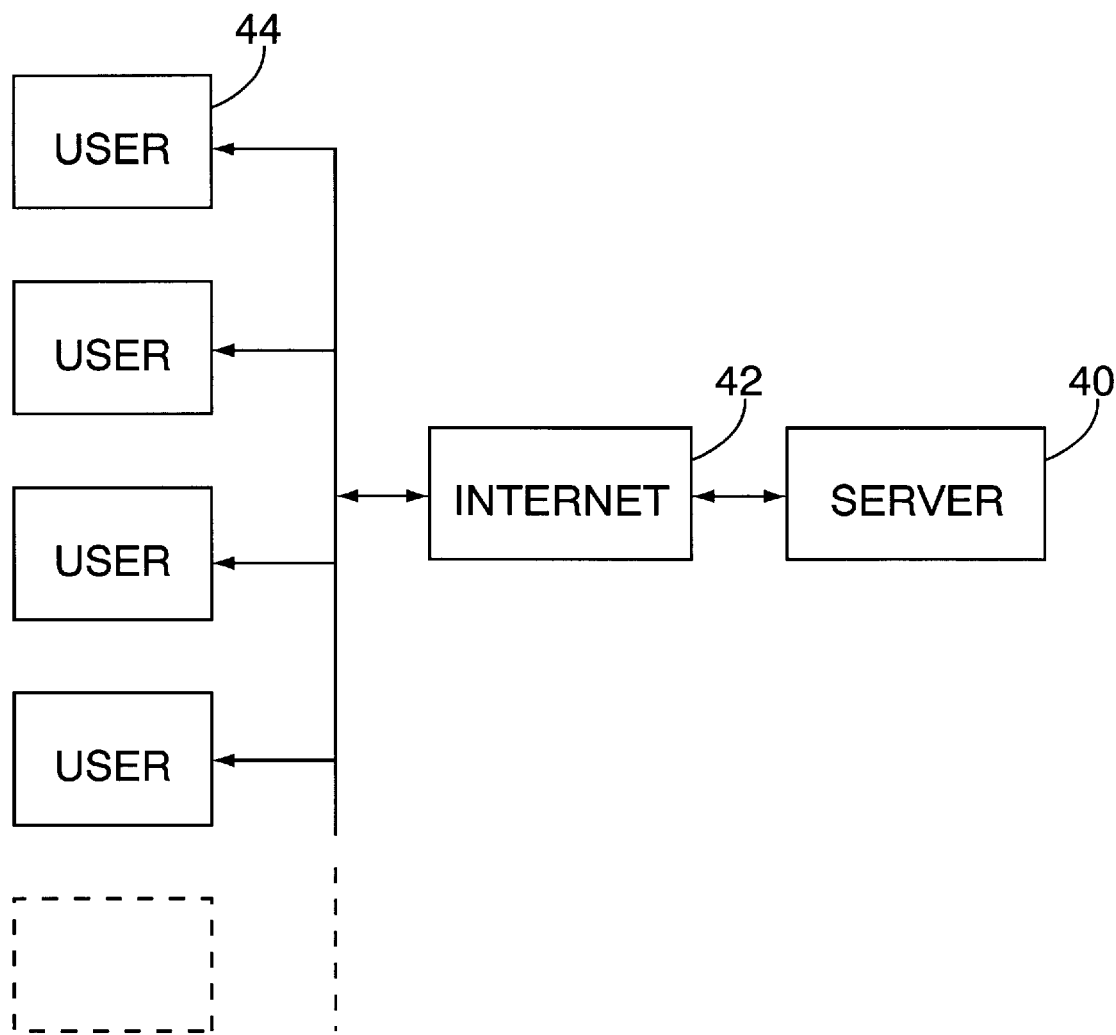
FIG. 5 is a block diagram of an Internet system on which the method and apparatus may be used.

FIG. 5 shows the Internet system on which an embodiment of the method and apparatus may be used. The server 40 is an apparatus as shown in FIG. 4, and it is preferred that server 40 displays a World Wide Web Page when accessed by a user via Internet 42. Server 40 also accepts input over the Internet 42. Multiple users 44 may access server 40 simultaneously. In other embodiments, the system may be a stand-alone device, e.g. a kiosk, which a user physically approaches and with which the user interacts. Alternatively, the system may operate on an organization's internal web, commonly known as an Intranet, or it may operate via a wireless network, such as satellite broadcast.

EXAMPLE 1

The following example is one way of using the invention, which can be used to recommend items in various domains for many items. By way of example, a new user 44 accesses the system via the World Wide Web. The system displays a welcome page, which allows the user 44 to create an alias to use when accessing the system. Once the user 44 has entered a personal alias, the user 44 is asked to rate a number of items, in this example the items to be rated are recording artists in the music domain.

After the user 44 has submitted ratings for various recording artists, the system allows the user 44 to enter ratings for additional artists or to request recommendations. If the user 44 desires to enter ratings for additional artists, the system can provide a list of artists the user 44 has not yet rated. For the example, the system can simply provide a random listing of artists not yet rated by the user 44. Alternatively, the user 44 can request to rate artists that are similar to recording artists they have already rated, and the system will provide a list of similar artists using the item similarity values previously calculated by the system. The user can also request to rate recording artists from a particular group, e.g. modern jazz, rock, or big band, and the system will provide the user 44 with a list of artists belonging to that group that the user 44 has not yet rated. The user 44 can also request to rate more artists that the user's 44 neighboring users have rated, and the system will provide the user 44 with a list of artists by selecting artists rated by the user's 44 neighboring users.

The user 44 can request the system to make artist recommendations at any time, and the system allows the user 44 to tailor their request based on a number of different factors. Thus, the system can recommend artists from various groups that the user's 44 neighboring users have also rated highly. Similarly, the system can recommend a predetermined number of artists from a particular group that the user will enjoy, e.g. opera singers. Alternatively, the system may combine these approaches and recommend only opera singers that the user's neighboring users have rated highly.

The system allows the user 44 to switch between rating items and receiving recommendations many times. The system also provides a messaging function, so that users 44 may leave messages for other users that are not currently using the system. The system provides "chat rooms," which allow users 44 to engage in conversation with other users 44' that are currently accessing the system. These features are provided to allow users 44 to communicate with one another. The system facilitates user communication by informing a user 44 that another user 44' shares an interest in a particular recording artist. Also, the system may inform a user 44 that another user 44 that shares an interest in a particular recording artists is currently accessing the system, the system will not only inform the user 44, but will encourage the user 44 to contact the other user 44' that shares the interest. The user 44 may leave the system by logging off of the Web Page.

EXAMPLE 2

In another example, the system is provided as a stand-alone kiosk which is used by shoppers in a retail establishment. The kiosk has an output device such as a display screen or printer, and possible an input device, such as a touch screen or keyboard. The kiosk has a memory element which allows it to store profiles for items and users. In come cases, the kiosk may be provided with a CD-ROM drive for allowing "preseeded" user and item profiles to be loaded into the kiosk.

In this example, a user may approach a kiosk to determine an item which is recommended for them. The user would input their alias from the system of EXAMPLE 1, and the kiosk could access the CD-ROM in order to load the user's profile into memory. The kiosk may also load similarity factors which have been calculated before hand or the kiosk may calculate the similarity factors now. The kiosk can then use any of the methods described above to create a list of recommended item which may be printed out for the user, displayed to the user on the display screen, or read aloud to the user through an audio device.

The kiosk may also provide the user with directions for how to find recommended items in the retail establishment, or the kiosk may allow the user to purchase the item directly by interacting with the kiosk.

In some embodiments, the system may include multiple apparati as described in Example 1 interconnected with multiple apparati as described in Example 2. For example, a first Web site can be provided which allows users to rate items of music, e.g. albums, artists, and songs, and a second Web site can be provided which allows users to rate books, magazines, short stories, and other literary works. The two separate Web sites may be interconnected and, in addition, may be connected to one or more kiosks as described in Example 2, such as a kiosk provided by a bookstore which allows users to rate items such as books, magazines, and short stories or a kiosk provided by a record store which allows users to rate albums, artists, and other items of musical interest.

Figure 6:
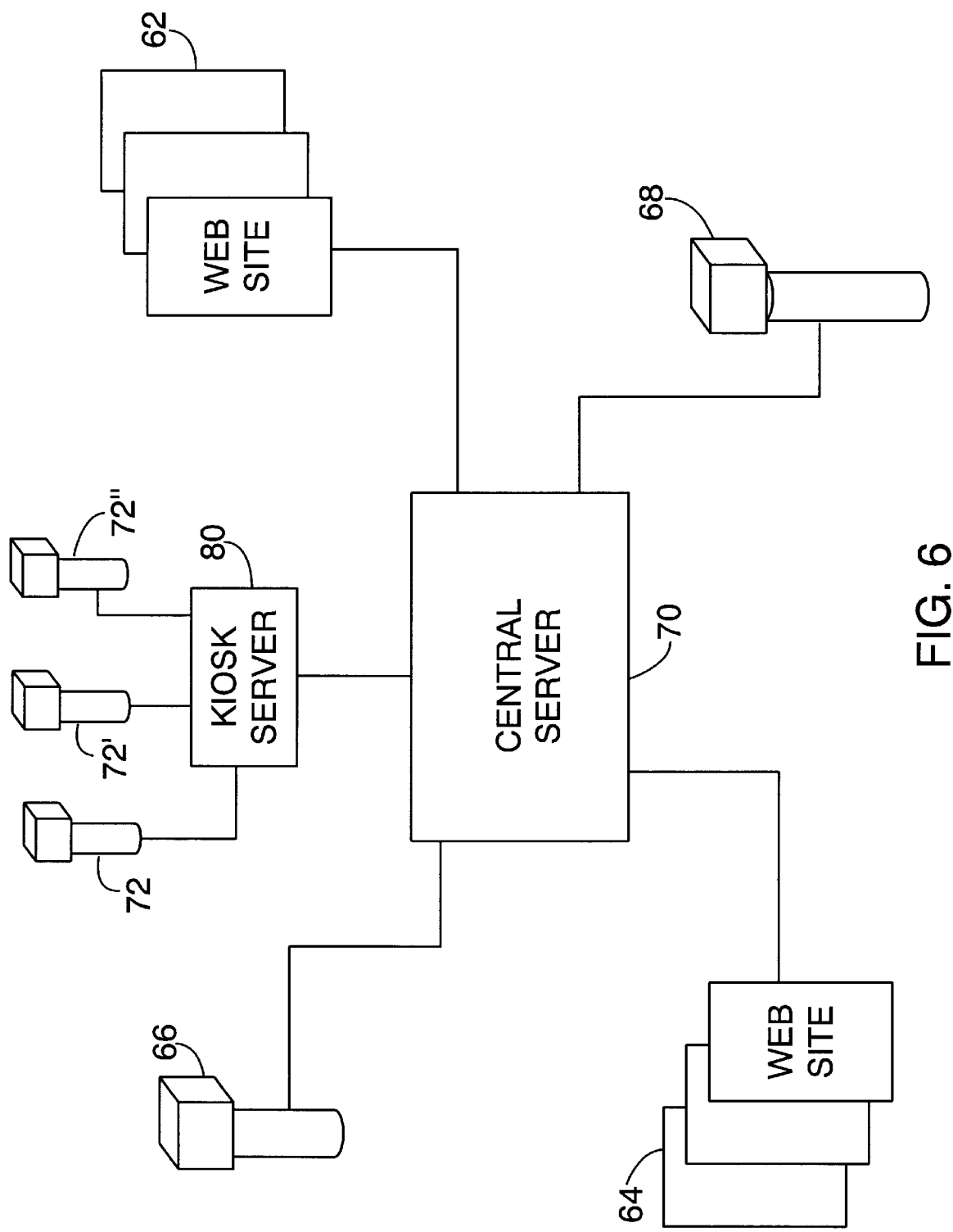
FIG. 6 is a block diagram of a distributed system for facilitating exchange of user information and opinion.

Referring now to the embodiment of the system shown in FIG. 6, it is generally desired that a user need only initially create a profile in one of the possible entry points, e.g. the music Web site 62, the literary Web site 64, the music kiosk 66, or the literary kiosk 68. If a user has created a profile in one subject area, ratings given by the user to items in that subject area may be used to recommend items in a different area. For example, if a user has logged into the literary Web site 64 and provided a number of ratings for books, it would be useful to access those literary ratings when the user logs into the music kiosk 66 to request music recommendations. A centralized server 70 may be provided which acts as a central repository for user profile data.

In such systems, the constituent parts, e.g. the music Web site 62, the literary Web site 64, the music kiosk 66, and the literary kiosk 68 are generally interconnected by traditional wide area network media and, most probably, are connected by telephone lines. A retail establishment may use more than one kiosk 72, 72', 72" to service customers. In this case, the kiosks 72, 72', 72" act as input devices, i.e. front-ends, connected to a kiosk server 80. The kiosk server 80 is connected to the wide-area network and transfers information to the central server 70. Because such wide area network media is subject to a number of environmental factors which may disrupt transmission between two interconnected points, e.g. Web site 64 and central server 70, a mechanism for providing distributed user management must be employed allowing users to create profiles at any entry point in the system and access those profiles from any other point in the system in a highly available manner.

A global user name space is provided by assigning each user a multiple byte identification code. When a user logs on to a site or a kiosk and indicates that he or she desires to create a new user profile (step 702), the user is prompted to enter at least an alias and password (step 704). The user may also be prompted to enter certain demographic information. The node must verify that the alias supplied by the user is not already in use (step 704). One method for verifying the alias is described below in connection FIG. 8.

If the alias supplied by the user is not already in use, then the node verifies whatever demographic data the user supplied (step 708). In embodiments where the user is not prompted to supply any demographic data, this step may skipped.

Demographic data is checked for validity in any one of a number of ways. For example, user supplied demographic data may be compared to demographic data supplied by similar users that have already registered to determine if any values given by the user are outside of ranges given by similar users. Alternatively, demographic data may be scanned for entries that supply conflicting information, for example, a demographic data profile stating that the user's age is under 18 and also that the user is employed as a doctor may be determined invalid. If the demographic data supplied by the user is not determined to be valid, the user is prompted to reenter certain information (step 704). The user may be prompted to reenter the offending demographic value, or the user may be required to select a new alias, a new password, and prompted for new demographic data.

If the demographic data supplied by the user is determined to be valid, the node creates a local identified code for the user (step 712). Each node is assigned a unique identification code. The identification code assigned to each node is combined with the four byte identification code assigned to the user by the node to provide the user with a globally unique identification code.

In one embodiment, users are assigned an 8 byte user identification code which consists of 4 bytes identifying the node on which the user created his or her initial profile and the other 4 bytes of which indicate the user's selected alias. It would be clear to one of ordinary skill in the art that the number of bytes used to uniquely identify users could be enlarged in order to accommodate larger populations of users or of sites and kiosks. Similarly, it would be clear that the bytes in the identification code could be unevenly split between users and sites, i.e. in the example above the user identification code could require 5 bytes and the node identification code could require only 3 bytes.

Each node that is able to receive registration information from users, i.e. Web sites 62, 64 and kiosks 66, 68, must be provided with appropriate memory elements to cache user registration data in the event that such data cannot be transmitted to the central server 70. Each node periodically attempts to connect to the central server 70 to transmit any registration data which it has collected (step 714). In the event that the network between the node and the central server 70 is not functional, the node waits a predetermined period of time before attempting to transmit to the central server 70 again.

This capability may be implemented as a daemon, i.e. a background process which executes in a continuous loop and attempts to transmit registration data to the central server 70. In another embodiment, this capability may be provided as a thread of execution which continually tries to send registration data to the central server 70.

As long as the network between the node and server 70 is functional, the node transmits registration data to the central server 70 using any one of a number of wide area network protocols. For example, the node may transmit registration information data to the central server 70 using the LDAP protocol. As the node transmits registration information data to the central server 70, it may remove the cached information from its memory element. However, it is preferable for the node to continue caching registration information data until data must be removed from the cache because the cache is too full. Any cache replacement mechanism currently known in the art may be used to remove registration information data from the node's cache, including least-recently-used, first-in-first-out, or random replacement. The central server 70 records the transmitted data upon receipt.

As noted above, a user accessing the system via the World Wide Web would encounter a welcome page on a Web site which allows the user to create an alias and a user profile. A user accessing the system via a kiosk may also encounter such a welcome page, although the kiosk may provide a button which the user presses to begin the user profile creation process. Regardless of how the process is begun, the user selects an alias and indicates his or her selection to the Web site or kiosk. The alias selection may be indicated to the node by typing the alias on a keyboard, by providing an alias on a magnetically-striped card which is swiped to read the alias from the card, or the alias may be entered by voice recognition. Once the node has received the alias information from the user it requests that the user select a password which prevents the user's profile from being used by anyone other than that user. Additionally, the node may request other information from the user such as demographic information.

Figure 7:
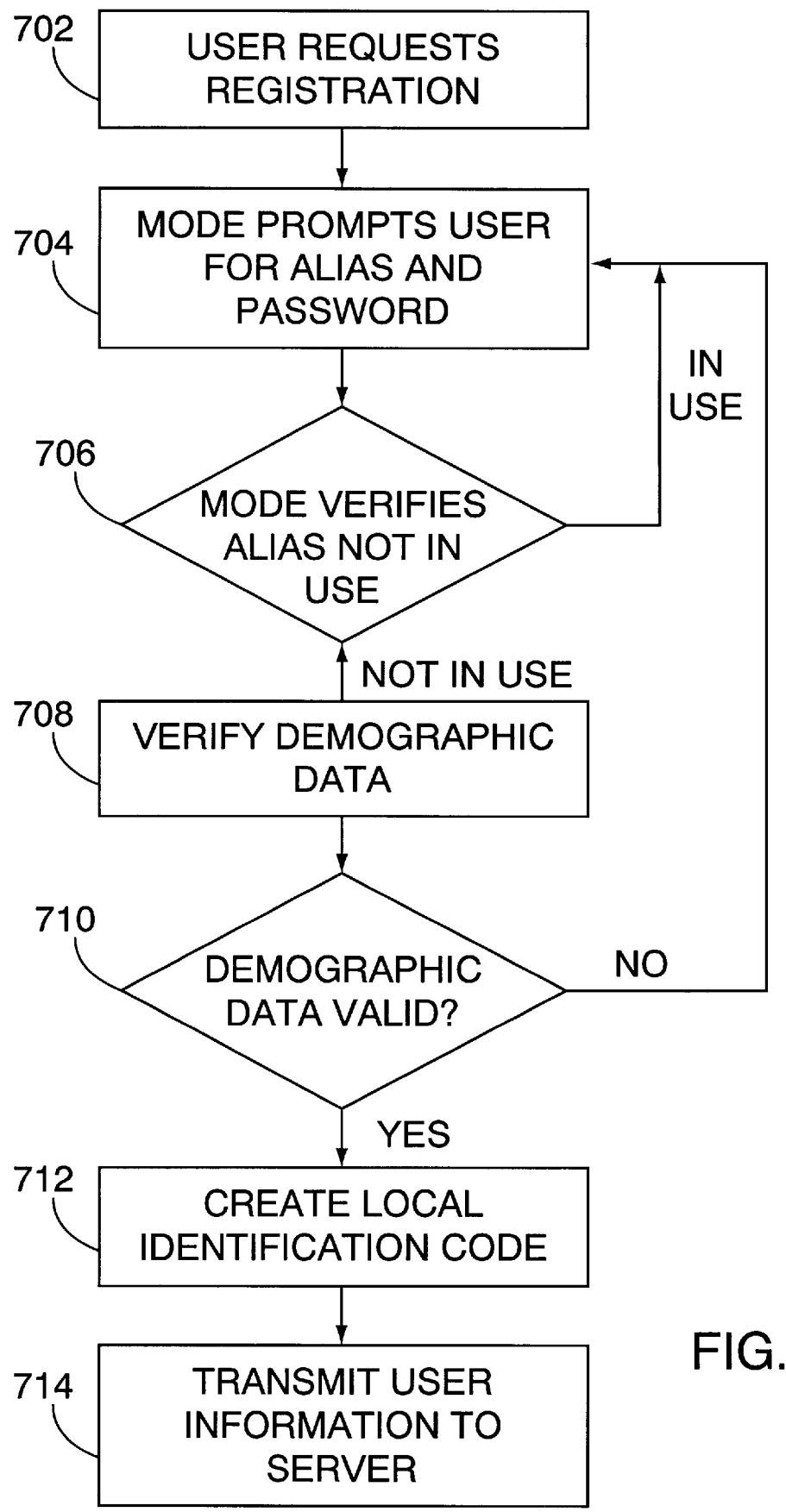
FIG. 7 is a flow chart of the steps taken to register a user.
Figure 8:
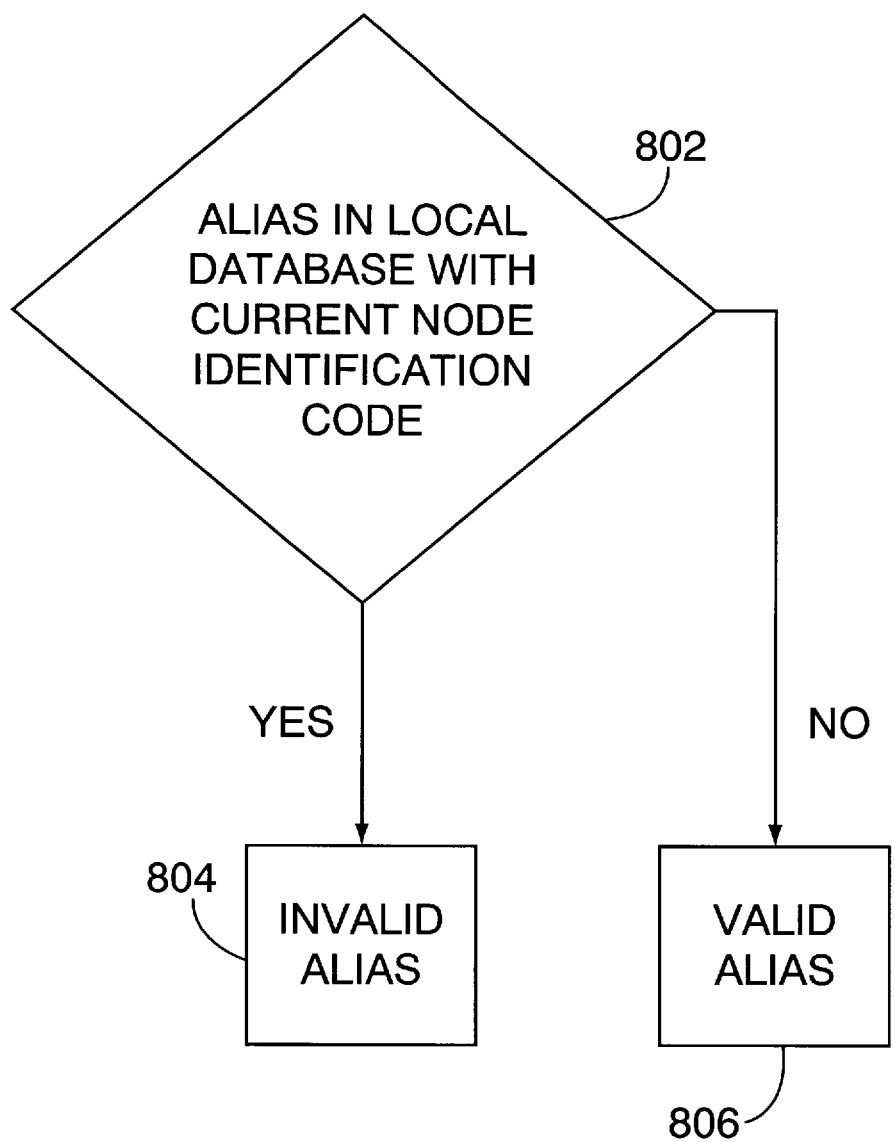
FIG. 8 is a flow chart of the steps taken to verify whether an alias is in use.

FIG. 8 depicts one embodiment of the steps taken by a node to verify that an alias is not use (step 706). Once the node has acquired all the desired information from the user, it must verify that the alias selected by the new user is not in use. In one embodiment, the node determines if there is an alias with the current node identification code stored in the node's local database (step 802). If so, the alias has already been selected and the alias is invalid (step 804). The user is then prompted to select a new alias (step 704). If no, alias combined with the node identification code is present in the node's local database then the alias is valid, and the registration process described in connection FIG. 7 continues. The node does not need to check with the central server 70 to determine if another user in the system has selected the same alias because the identity of the node on which the user profile is created is embedded in the user identification codes. Therefore, as long as the node has stored in a memory element a list or table of every user alias associated with profiles created on that node, and as long as no alias conflict exists with the aliases stored in that local list or table, then the uniqueness of the identification code which will be assigned to the user based on the alias chosen is guaranteed.

If the node determines that the alias can be assigned to the user, the node makes the assignment and prepares to transmit the registration information to the central server 70. As noted above, the node will attempt to transmit the registration information over the network (step 714), however, the network may be busy or the network may be nonfunctional due to environmental and physical factors, such as downed lines. If the network between the node and the central server 70 is, in fact, nonfunctional then the node will store the registration information data locally in a memory element and will continue to attempt to transmit the user registration information periodically. While the network is down and the node is attempting to transmit cached user registration information data, other users may create user profiles and users may utilize the node to obtain recommendations for items and to provide ratings for items.

In one embodiment, if the user provides ratings for items while the registration information is cached, then the node may cache the ratings provided by the user with the user registration information. In this embodiment, when the node successfully transmits the user registration information to the central server 70 it also transmits ratings provided by the user. User registration information may be cached at the node using a buffer in which data is entered when the node desires to transmit it to the central server 70, or data stored by the node may be provided with a flag or bit which indicates when the data should be sent to the central server 70 and when it has already been sent to the central server 70.

Once a user has created a user profile on a node, and the node has transmitted the user registration information to the central server 70, then that user is able to log in to any node present on the network. For example, referring to FIG. 6, a user may create his or her user profile using Web site 62. Once Web site 62 has transmitted the user registration information to the central server 70, then the user is able to log in to the kiosks 66, 68, 72, 72', or 72" and the user's profile will be available to those nodes.

When a user logs in to a node that is different from the one on which it created its user profile that node must verify the user is a valid user of the entire system. The node does this by first checking its local database to determine if it can verify the user's identification code. The node's local database storage may include users in addition to the ones that created their user profile on that node.

If the user's identification code is not stored locally then the node transmits a user verification request to the central server 70. In the event that the network between the node and the communication server 70 is nonfunctional, the user verification request fails and the user is not able to log on to the node at that time.

If the user verification request is successfully transmitted to the central server 70, then the central server 70 determines if the transmitted alias and password information or network id and password is valid for any user of the system. The central server 70 stores information associating user aliases with the appropriate passwords in any manner including as a table. If the user's alias and password matches then the central server 70 sends a message back to the node that the user is verified and the user's log in is successful. In addition, the central server 70 may transmit additional information associated with the user, such as demographic information. In alternative embodiments, the central server 70 may transmit only the user verification message and the node must request additional information from the central server 70. If the central server 70 does not find the user's alias and password combination in its data store, then it transmits a verification failed message to the node and the user's log in to the system is unsuccessful.

A node requests user information from the central server 70 in response to a number stimuli. In the example above, the node requested user information in response to the user's attempt to log in to the node. However, the node may also request user information for its own purposes. For example, a node may desire to send an advertisement to users having a particular demographic profile. The node could request demographic data for each user logged into the node. The central server 70 would transmit the demographic data to the node and the node could then select one or more users to display an advertisement to which to display an advertisement.

It is desirable to provide users with an ability to control the entities to which the central server 70 will transmit data about that user. It is further desirable to allow the users to select certain types of information which should not be transmitted e.g., a user may wish to have preference data transmitted but not demographic data.

In one embodiment, the central server 70 hosts a table which associates users, sites, and types of information. Alternatively, the server may host separate tables, one of which associates users and sites and one of which associates users and types of information. In this embodiment, the server 70 is required to access two tables to determine if data may be sent to the central server 70. Regardless of whether one table or multiple tables are used, when the server 70 receives a request for user data it queries the table to determine if data should be sent.

The table or tables may be populated with bytes or bits which act as flags enabling or disabling transmission of data from the central server 70. For example, a "0" may indicate to the central server 70 that data should not be transmitted and a "1" could indicate the data can be transmitted. Using this convention, a user having all "0" entries would not allow any information to be transmitted to a node. While this would provide the user with a high degree of privacy, it would inhibit the nodes from making recommendations to the user because the nodes would be unable to access the user's preference data stored on the central server 70.

Data transmitted from the central server 70 may be encrypted in order to prevent a breach of the user's privacy. In some embodiments, the central server 70 sends the encrypted data to the node together with a key that the node will need to decrypt the data. In other embodiments, the central server 70 sends the encrypted data to the node and assumes that the node has the key required to decrypt the data. For example, the key used to encrypt the data may be the user's password. Since the node received the user's password from the user during log in, the node will be able to decrypt the user information.

In other embodiments, encryption can be used to allow the user to control access to his or her data. For example, the user profile information may be encrypted with multiple keys and only a node with all of the encryption keys may access the data. A user may specify an encryption key to be used to encrypt his or her data. In addition, for example, the central server 70 may use the node's identification code, assigned above, as a first encryption key and may use the user's password as a second encryption key. A requesting node would receive the user's information from the central server 70 but, unless it has both its own identification code and the user's password, the node would be unable to decrypt the user's information.

Additional encryption keys may be specified by the user to control which nodes or which information are transmitted. For example, the user may indicate that only preference data should be transmitted to nodes. A preference data encryption key can be assigned by the central server 70 and used to encrypt the user's preference data. A node requesting the user's preference data may be given the preference data encryption key by the central server 70 at the time of the request, or the central server 70 may transmit the preference data encryption key to all nodes periodically. Transmitting encryption keys periodically allows those keys to be updated to further strengthen the security of the system.

The actual type of encryption used may vary depending on the geographic scope of the network. For example, a network spanning international boundaries could use the DES encryption standard in order to provide users with a fair degree of privacy while complying with United States export laws. However, other encryption standards may be used such as pgp.

Use of encryption to secure user information data enables the formation of an information marketplace. In an embodiment in which the node has the option of decrypting the received user information data itself or requesting the central server 70 to decrypt the user profile information, the central server 70 may charge the node a fee for decrypting the data. Such a fee could be based on anyone of a number of factors, such as the amount of information to be decrypted, the type of information, or a fee selected by the user to indicate how valuable the user perceives the associated profile information.

In other embodiments, the central server 70 can charge for the decryption key itself. In these embodiments, a node requesting user profile information would pay a fee to receive the decryption key from the central server 70 and can use the decryption key to decrypt the user profile information transmitted to it by the central server 70. In these embodiments, the central server 70 would likely change the decryption key periodically in order to require nodes to pay on a periodic basis. The fee charged for each decryption key could vary as described above, and in addition, could vary in response to the length of time the decryption key is valid. For example, a decryption key which will be valid longer would support a larger fee than a decryption key that would expire quickly.

In some embodiments, user profile information is segregated into profile sections. A profile section represents user preference data for a particular group of items or items having a particular feature. For example, a user's preference information may be broken down into a profile section relating to books, one relating to music, one relating to art, one relating to cooking, one relating to restaurants, and so one. A node typically requests only the profile section which is relevant to the domain in which it operates. If a fee is charged for certain user information, or for decryption/encryption keys associated with certain information, those fees may also be set depending on the value of a particular profile section. The value accorded to a particular profile section may vary depending on many factors, including the number of ratings present in a particular section, the validity of the ratings in a particular section (i.e. the quality of the data in that section), the number of consuming nodes in the marketplace for the profile section information, the number of users that have allowed transmission of the data contained in the profile section, and others.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A system for enabling an information marketplace, comprising:
    a central server connected to a network, said server having access to a memory for storing profile data in a plurality of profiles;
    a data structure accessible by said server associating each of the profiles with at least one associated node, said data structure indicating whether each associated node has authorization to access profile data of the associated profile; and
    the central server receiving a request from a requesting node to obtain profile data from at least one profile and accessing the data structure to make a determination whether the requesting node has the authorization to access profile data of each profile requested, and for each profile requested, returning profile data to the node if the node has the authorization for that profile.

2. A system for enabling an information marketplace, the system comprising:
    a central server connected to a network, said server having access to a memory for storing profile data that has been encrypted using one or more encryption keys, and to information indicating whether each of a plurality of nodes has authorization to access the profile data; and
    said central server receiving a request for profile data from a node and determining whether that node has authorization to access to the profile data, and if so, transmitting decrypted profile data to that node in response to the request.

3. A method for enabling an information marketplace, the method comprising the steps of:
    (a) encrypting stored profile data using one or more encryption keys;
    (b) receiving a request for profile data from a requesting node;
    (c) determining if the requesting node has authorization to access the profile data, and if so, providing information for decrypting the encrypted profile data to the requesting node; and
    (d) transmitting encrypted data in response to the request.

4. The system of claim 1 wherein the profile data includes user preference information about items.

5. The system of claim 1 wherein the profile data includes user demographic data.

6. The system of claim 1 wherein at least one of the profiles includes first profile data comprising user preference information about items and second profile data comprising user demographic data, and wherein a node has authorization to access only one of said first or second profile data.

7. The system of claim 1 wherein the profile data includes user ratings of items.

8. The system of claim 1 wherein the data structure is stored in a memory element of the central server.

9. The system of claim 8 wherein the data structure is a table.

10. The system of claim 1 wherein the profiles are stored in another server connected to the central server.

11. The system of claim 1 wherein the profile data is encrypted in the memory, and wherein the central server returns decrypted profile data to the requesting node.

12. The system of claim 1 wherein the profile data is encrypted in the memory, and wherein the central server returns encrypted profile data to the requesting node.

13. The system of claim 1 wherein the profile data is encrypted in the memory, and wherein the central server returns encrypted profile data to the requesting node, and wherein a user of the requesting node provides information to the requesting node for decrypting the encrypted profile data.

14. The system of claim 2 wherein the profile data includes user preference information about items.

15. The system of claim 2 wherein the profile data includes user demographic data.

16. The system of claim 2 wherein at least one of the profiles includes first profile data comprising user preference information about items and second profile data comprising user demographic data, and wherein a node has authorization to access only one of said first or second profile data.

17. The system of claim 2 wherein the profile data includes user ratings of items.

18. The system of claim 2 wherein the memory comprises a memory element of the central server.

19. The system of claim 2 wherein the information indicating whether each of a plurality of nodes has authorization to access the profile data is stored in a table.

20. The system of claim 2 wherein the information indicating whether each of a plurality of nodes has authorization to access the profile data is stored in another server connected to the central server.

21. The system of claim 2 wherein at least some of the profiles are stored in another server connected to the central server.

22. The method of claim 3 wherein the step of determining if the requesting node has authorization to access the profile data includes the step of accessing a table associating nodes with profile data.

23. The method of claim 3 wherein the step of providing information for decrypting the encrypted profile data includes the step of returning a key to the requesting node.

24. The method of claim 3 wherein the profile data includes at least two distinct types of data, and wherein the step of determining if the requesting node has authorization to access the profile data includes the step of determining if the requesting node has authorization to access each type of data.

25. The method of claim 24 wherein the step of transmitting encrypted data in response to the request comprises the step of transmitting only profile data to which the requesting node has access.

26. A method for enabling an information marketplace, comprising the steps of:

storing profile data in a plurality of profiles;

storing for each profile at least one node associated therewith and for each associated node, whether the node has authorization to access that profile;

receiving a request for profile data from a requesting node;

determining whether the requesting node has authorization to access profile data of a profile; and transmitting profile data of that profile to the node if the node has authorization to access that profile.

27. A method for enabling an information marketplace, comprising the steps of:

storing profile data including at least two distinct types of information;

storing authorization information for each type of information in the profile data indicative of whether a node has authorization to access that type of information;

receiving a request for profile data from a requesting node;

determining from the authorization information whether the requesting node has authorization to access each type of profile data of the associated profile; and for each type of information for which the node has authorization, transmitting profile data of that type to the node.

* * * * *

UNITED STATES PATENT AND TRADEMARK OFFICE
CERTIFICATE OF CORRECTION

PATENT NO : 5,872,850

DATED : February 16, 1999

INVENTOR(S): Klein et al

It is certified that error appears in the above-identified patent and that said Letters Patent is hereby corrected as shown below:

Column 1, line 8, after "1996," delete --now pending--.

Column 7, line 58, change "lowerlevel" to --lower-level--.

Column 7, line 59, change "higherlevel" to --higher-level--.

Column 9, line 35, the formula should read as follows:

$$D_{xy} = \frac{\sum_{i \in I} c_{ix} c_{iy} (H_{ix} - H_{iy})^2}{\sum_{i \in I} c_{ix} c_{iy}}$$

Column 20, line 16, change "A," to --Δ,--.

Column 20, line 30, change "$FV_x^{60}$" to --$FV_x^a$--.

UNITED STATES PATENT AND TRADEMARK OFFICE
CERTIFICATE OF CORRECTION

PATENT NO : 5,872,850
DATED : February 16, 1999
INVENTOR(S): Klein et al

It is certified that error appears in the above-identified patent and that said Letters Patent is hereby corrected as shown below:

Column 20, line 53, the formula should read as follows:

$$\Delta(\vec{FV}^{\alpha}_{x}, \vec{FV}^{\alpha}_{y}) = \sqrt{\left(\frac{\|Users\|}{\sum_{I=1}^{\|Users\|} \eta^{\alpha}_{I\,x} \times \eta^{\alpha}_{I\,y}}\right) \times \left(\sum_{I=1}^{\|Users\|} \delta^{\alpha}_{I\,\eta}\right)}$$

Column 21, line 1, the formula should read as follows:

$$\Omega\left(\vec{FV}^{\alpha}_{x}, \vec{FV}^{\alpha}_{y}\right) = \begin{cases} \dfrac{\vec{v}^{\alpha_x}_I + \vec{v}^{\alpha_y}_I}{2} & \text{if } \eta^{\alpha}_{I\,x} = 1 \text{ and } \eta^{\alpha}_{I\,y} = 1 \\ \vec{v}^{\alpha_x}_I & \text{if } \eta^{\alpha}_{I\,x} = 1 \text{ and } \eta^{\alpha}_{I\,y} = 0 \\ \vec{v}^{\alpha_y}_I & \text{if } \eta^{\alpha}_{I\,x} = 0 \text{ and } \eta^{\alpha}_{I\,y} = 1 \end{cases}$$

Column 21, line 22, the formula should read as follows:

$$\vec{v}^{\alpha_x}_I = \left\langle \mu^{\alpha_x}_I, \sigma^{2\alpha_x}_I, N^{\alpha_x}_I \right\rangle$$

UNITED STATES PATENT AND TRADEMARK OFFICE
CERTIFICATE OF CORRECTION

PATENT NO : 5,872,850   Page 3 of 4
DATED : February 16, 1999
INVENTOR(S): Klein et al It is certified that error appears in the above-identified patent and that said Letters Patent is hereby corrected as shown below:

Column 22, line 4, the formula should read as follows:

$$\sigma^{2\alpha,\prime}_I = (\frac{(N^{\alpha\cdot}_I \times \sigma^{2\alpha\cdot}_I) + (N^{\alpha\prime}_I \times \sigma^{2\alpha\prime}_I)}{(N^{\alpha\cdot}_I + N^{\alpha\prime}_I)}) + (\frac{(N^{\alpha\cdot}_I + N^{\alpha\prime}_I) \times (\mu^{\alpha\cdot}_I - \mu^{\alpha\prime}_I)^2}{(N^{\alpha\cdot}_I + N^{\alpha\prime}_I)^2})$$

Column 22, line 55, the formula should read as follows:

$$\Omega(F\vec{V}^\alpha_x, F\vec{V}^\alpha_y) = \begin{cases} <\mu^{\alpha,\prime}_I, S^{2\alpha,\prime}_I, N^{\alpha,\prime}_I> & \text{if } \eta^{\alpha\cdot}_I = 1 \text{ and } \eta^{\alpha\prime}_I = 1 \\ <\mu^{\alpha\cdot}_I, S^{2\alpha\cdot}_I, N^{\alpha\cdot}_I> & \text{if } \eta^{\alpha\cdot}_I = 1 \text{ and } \eta^{\alpha\prime}_I = 0 \\ <\mu^{\alpha\prime}_I, S^{2\alpha\prime}_I, N^{\alpha\prime}_I> & \text{if } \eta^{\alpha\cdot}_I = 0 \text{ and } \eta^{\alpha\prime}_I = 1 \end{cases}$$

Column 24, line 17, change "$\tau^{60x}$" to --$\tau^{\alpha x}$--.

Column 25, line 6, the formula should read as follows:

$$f(P_1 \cap P_2) = \sum_{\alpha=1}^{|Features\ Defined|} F\vec{W}^\alpha_I \times (\sum_{\alpha,=1}^{|\alpha|} (CW^{\alpha\cdot}_I \times \gamma^{\alpha\cdot}_{P_1} \times \gamma^{\alpha\cdot}_{P_2}) + \sum_{l=1}^{|FV^\alpha|} (\Gamma^{\alpha\cdot}_{P_1} \times \Gamma^{\alpha\prime}_{P_2}))$$

UNITED STATES PATENT AND TRADEMARK OFFICE
CERTIFICATE OF CORRECTION

PATENT NO : 5,872,850
DATED : February 16, 1999
INVENTOR(S): Klein et al

It is certified that error appears in the above-identified patent and that said Letters Patent is hereby corrected as shown below:

Column 25, line 56, after "fashion", delete the period.

Column 26, line 21, change "are" to --area--.

Column 27, line 53, change "come" to --some--.

Column 33, line 19, change "one." to --on.--.

Signed and Sealed this

Fourteenth Day of September, 1999

*Attest:*

Q. TODD DICKINSON

*Attesting Officer*  *Acting Commissioner of Patents and Trademarks*